July 30, 1957 S. LUBKIN 2,801,406

ALPHABETIC-NUMERIC DATA PROCESSOR

Filed March 30, 1955 8 Sheets-Sheet 1

INVENTOR.
SAMUEL LUBKIN
BY S.C. Yuter
ATTORNEY

July 30, 1957 S. LUBKIN 2,801,406

ALPHABETIC-NUMERIC DATA PROCESSOR

Filed March 30, 1955 8 Sheets-Sheet 2

INVENTOR.
SAMUEL LUBKIN
BY S.C. Yuter
ATTORNEY.

July 30, 1957 S. LUBKIN 2,801,406

ALPHABETIC-NUMERIC DATA PROCESSOR

Filed March 30, 1955 8 Sheets-Sheet 3

INVENTOR.
SAMUEL LUBKIN
BY S.C. Yuter
ATTORNEY

July 30, 1957 S. LUBKIN 2,801,406

ALPHABETIC-NUMERIC DATA PROCESSOR

Filed March 30, 1955 8 Sheets-Sheet 4

INVENTOR.
SAMUEL LUBKIN

BY J.C. Yuter

ATTORNEY

ALPHABETIC-NUMERIC DATA PROCESSOR

Filed March 30, 1955 8 Sheets-Sheet 5

INVENTOR.
SAMUEL LUBKIN
BY S. C. Yuter
ATTORNEY

ALPHABETIC-NUMERIC DATA PROCESSOR

Filed March 30, 1955 8 Sheets-Sheet 6

INVENTOR
SAMUEL LUBKIN
BY
ATTORNEY

INVENTOR.
SAMUEL LUBKIN
BY S. C. Yuter
ATTORNEY

ALPHABETIC-NUMERIC DATA PROCESSOR

Filed March 30, 1955 8 Sheets-Sheet 8

INVENTOR.
SAMUEL LUBKIN

BY S.C. Yuter

ATTORNEY.

United States Patent Office 2,801,406

Patented July 30, 1957

2,801,406

ALPHABETIC-NUMERIC DATA PROCESSOR

Samuel Lubkin, Bayside, N. Y., assignor to Underwood Corporation, New York, N. Y., a corporation of Delaware Application March 30, 1955, Serial No. 498,000

13 Claims. (Cl. 340—173)

This invention relates to data processing, and more particularly to a method of and apparatus for processing mixed alphabetic and numerical data in a high-speed electronic digital computer.

Computing consists of performing arithmetic and logical operations on numbers. A digital computer performs such operations with numbers expressed in the form of digits. The binary system of computation, using the binary digits "1" and "0,' is well suited to computers since a binary digit may be expressed by the presence or absence of a particular condition; for example, the presence or absence of a given magnetic state on a unit area or cell of a magnetic memory medium, or the presence or absence of an electrical pulse at a specified position in a group of pulses.

A decimal number N is represented in the binary arithmetic system by the following formula:

$$N=A_n(2^n)+A_{n-1}(2^{n-1})+\cdots+A_1(2^1)+A_0(2^0)+A_{-1}(2^{-1})+\ldots+A_{-n}(2^{-n})$$

in which each of the constants $A_n$, $A_{n-1}$, $\cdots$ $A_{-n}$ is 0 or 1. For instance, the number 23, which can be written:

$$23=1(2^4)+0(2^3)+1(2^2)+1(2^1)+1(2^0)=16+0+4+2+1$$

is written: 10111 in the binary system.

The first seventeen decimal numbers are shown in binary form in the following table:

| | |
|---|---|
| 0 | 0 |
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |
| 16 | 10000 |

For any number the first digit from the right signifies whether there is a one ($2^0$) in the number or not, the second digital place whether there is a two ($2^1$) or not, the third whether there is a four ($2^2$) or not, the fourth whether there is an eight ($2^3$) or not, and so on.

In computers of the data processing type, combinations of binary digits may represent alphabetic information in addition to numbers. The processing of this information may consist not only for arithmetic operations on numbers but also sorting, collating, selecting, transcribing and other similar operations upon mixed numerical and alphabetic data. A "character" of the data may be a numerical digit, a letter of the alphabet, a punctuation mark, a space, a symbol which may produce a carriage return when transmitted to an electrically operated typewriter, or any similar symbol.

Equipment for processing data through the use of punched cards has been in common use for many years. In recent times there has been an increasing tendency to make use of high-speed electronic equipment for similar purposes.

In order to process data in electronic circuits, the information must be represented by electrical signals; for example, electrical pulses. Digital representation employing code groups of pulses requires that each character of the data be denoted by a different arrangement of pulses which are either present or absent at particular positions in a code group. A pulse can be considered present and representating a "1" if its amplitude is above a critical level, sometimes called the "gating level." A pulse having a magnitude below a critical level, for example, the "noise level," may be considered absent, thus denoting a "0."

It is a property of binary numbers that an $n$-digit number can represent $2^n$ combinations. That is, a code group of four pulses, corresponding to a number of four binary digits, can represent any one of sixteen ($2^4$) different characters. In particular, four binary digits are more than enough to represent any decimal digit, 0 through 9. However, if we wish to represent not only numerical but also alphabetic data, each character requires six binary digits, since twenty-six letters and ten numerals require thirty-six combinations. As $2^6$ equals sixty-four, twenty-eight additional combinations are available to represent punctuation marks, spaces, and other characters.

To distinguish binary digits from other types of digits, for example, decimal digits, the term "bit" will hereinafter be used to mean binary digit. Also, unless otherwise indicated, hereinafter when terms like digit or character are used in connection with the operation of the computer, it will be understood to mean signals representing a digit or a character.

A data processor must have a memory for storing the data and it is desirable that this memory be as large as possible. Large memories are expensive and it is therefore important to use them efficiently. Consequently, if most of the data to be stored is numerical and only a relatively small part is alphabetic, it is a waste of valuable memory capacity to use six bits of storage space for every character when four bits will suffice in most cases.

It is accordingly an object of the invention to provide an improved method of processing alphabetic and numeric data.

Another object of the invention is to provide an improved method of and apparatus for processing mixed alphabetic and numeric data which does not waste expensive memory facilities.

A further object of the invention is to provide a method of and apparatus for processing mixed alphabetic and numeric data which will conserve memory capacity without complicating the processing operations of a high-speed electronic data processor.

The invention will hereinafter be described, by way of example only, primarily in connection with the input-output equipment of a high-speed electronic digital data processor capable of processing mixed data, and employing an electric typewriter as an input-output device to insert mixed data and to print the results of the data processor operations.

In accordance with the invention the information comprising alphabetic and numeric characters is stored as assortments of code groups of signals. An additional signal is associated with each assortment of code groups of signals. The associated signal is used to designate whether the code groups of signals in the assortment are to be interpreted singly or in pairs.

In an illustrative embodiment of the invention, apparatus is provided for representing each assortment of code groups of signals called a word, as nine four-bit code groups with each four-bit code group of signals representing a digit. The first digit position of each word is designated as the sign position. The remaining eight digit positions are for either alphabetic or numeric characters. The numeric characters are zero to nine. Thus, when numeric information is indicated, there are eight numeric characters per word. When alphabetic information is indicated, the alphabetic characters are represented by pairs of digits. The alphabetic characters A to I are represented by the digit pairs 21 to 29, the alphabetic characters J to R by the digit pairs 31 to 39 and the alphabetic characters S to Z by the digit pairs 42 to 49. If numeric characters are mixed with alphabetic characters in the word, then the numeric characters are represented by the digit pairs 10 to 19. One of the following characters is inserted in the sign position plus (+), minus (—) or alphabetic indicator. The plus and minus signs have their usual arithmetic significance while the alphabetic indicator is used to designate that the associated word represents alphabetic or mixed alphabetic and numeric information.

Thus any word preceded by an alphabetic indicator is interpreted as comprising alphabetic or mixed alphabetic and numeric characters and any word preceded by a plus or minus sign is considered as comprising solely numeric characters. The alphabetic indicator may be a character such as a comma (,). For example, assume that the following information is to enter the data processor: AJS987654321. The information will be handled within the data processor as the two words ",21314219" and "+87654321." It should be noted that the second word of the group is purely numerical and hence can easily be handled arithmetically. The first word can also be handled arithmetically in a more restricted manner but, as will be shown, these restrictions in no way offset the usual method of handling alphabetic information in a data processor.

An advantage of the invention is that since an arithmetic sign is usually associated with words in a data processor there is no waste of memory space by associating an indicator with each word since the indicator may occupy the sign position.

Other objects, features and advantages of the invention will apepar in the subsequent detailed description which is accompanied by drawings wherein:

Fig. 2 is a table of symbols which are hereinafter employed to simplify the detailed explanation of the invention and includes a schematic equivalent of each symbol, wherein:

Figure 2A:
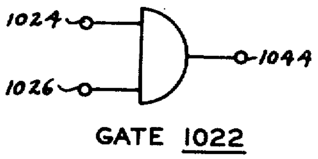

Fig. 2*a* illustrates the symbol which represents a coincidence ("and") gate.

Figure 2B:
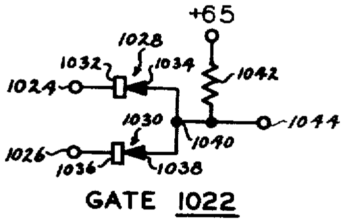

Fig. 2*b* shows the schematic diagram of the gate of Fig. 2*a*.

Figure 2C:
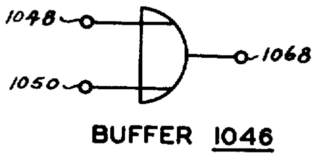

Fig. 2*c* indicates the symbol which stands for a buffer ("or" gate).

Figure 2D:
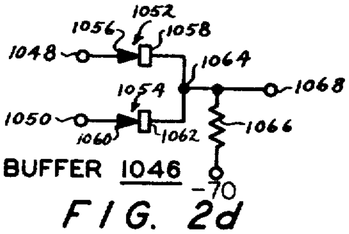

Fig. 2*d* shows the buffer of Fig. 2*c* in schematic form.

Figure 2E:
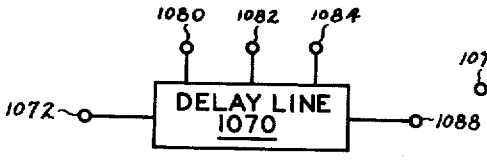

Fig. 2*e* illustrates the symbolic diagram of a delay line.

Figure 2F:
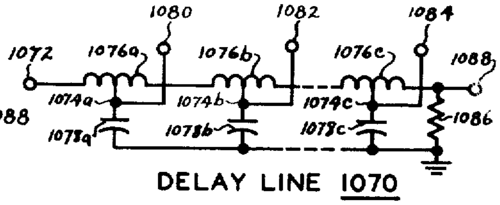

Fig. 2*f* indicates the schematic representation of the delay line of Fig. 2*e*.

Figure 2G:
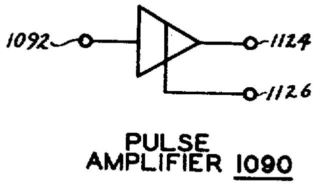

Fig. 2*g* symbolically shows a pulse amplifier.

Figure 2H:
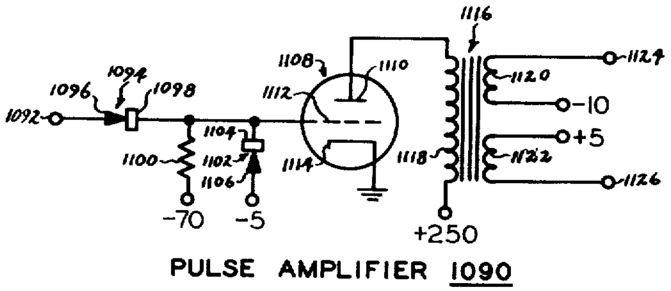

Fig. 2*h* illustrates the pulse amplifier of Fig. 2*g* in schematic form.

Figures 2I, 2J:
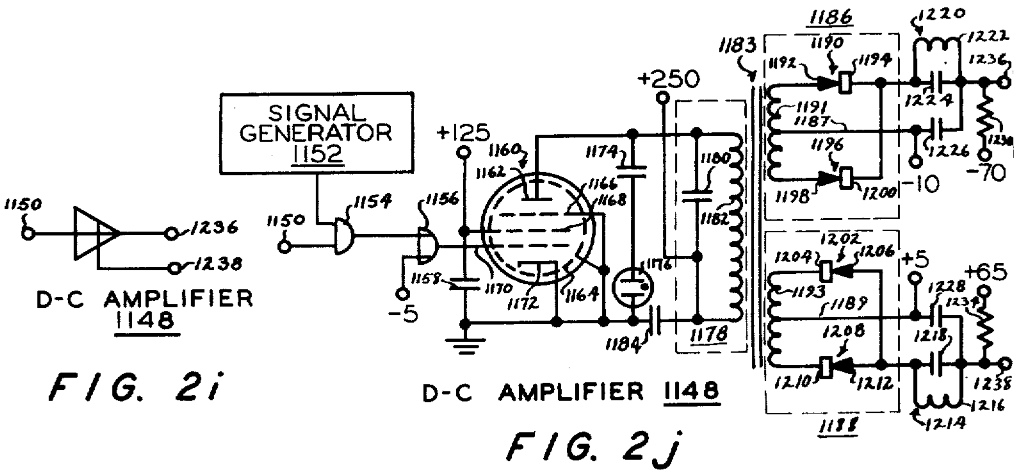

Fig. 2*i* shows the symbol for a D.-C. amplifier.

Fig. 2*j* shows the schematic diagram of the D.-C. amplifier of Fig. 2*i*.

Figure 2K:
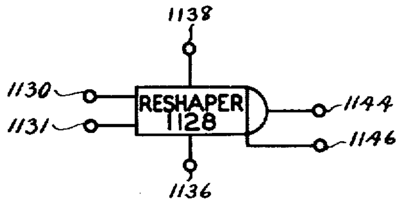

Fig. 2*k* illustrates a reshaper in symbolic form.

Figure 2L:
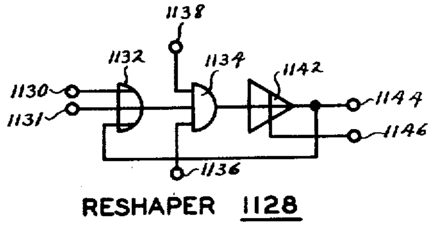

Fig. 2*l* schematically shows the reshaper of Fig. 2*k*.

Figure 2M:
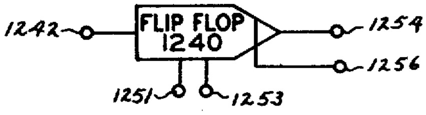

Fig. 2*m* shows symbolically a flip flop.

Figure 2N:
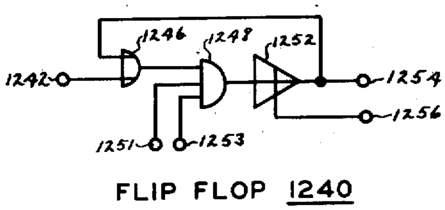

Fig. 2*n* schematically illustrates the flip flop of Fig. 2*m*.

Figure 1:
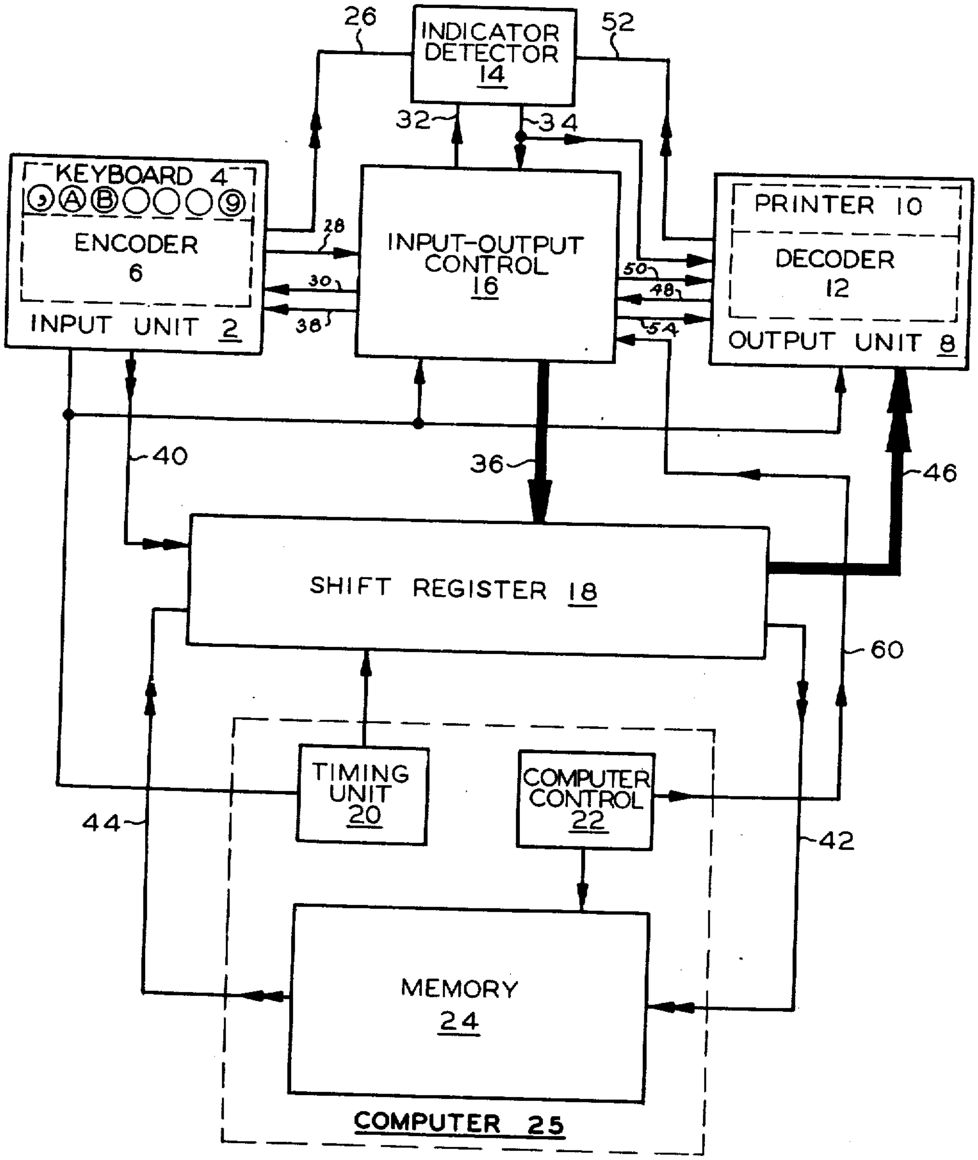
Fig. 1 is a schematic block diagram of the input-output equipment of a high-speed electronic data processor capable of handling mixed alphabetic and numeric data in accordance with one embodiment of the invention, and including a memory for storing the information.
Figure 3:
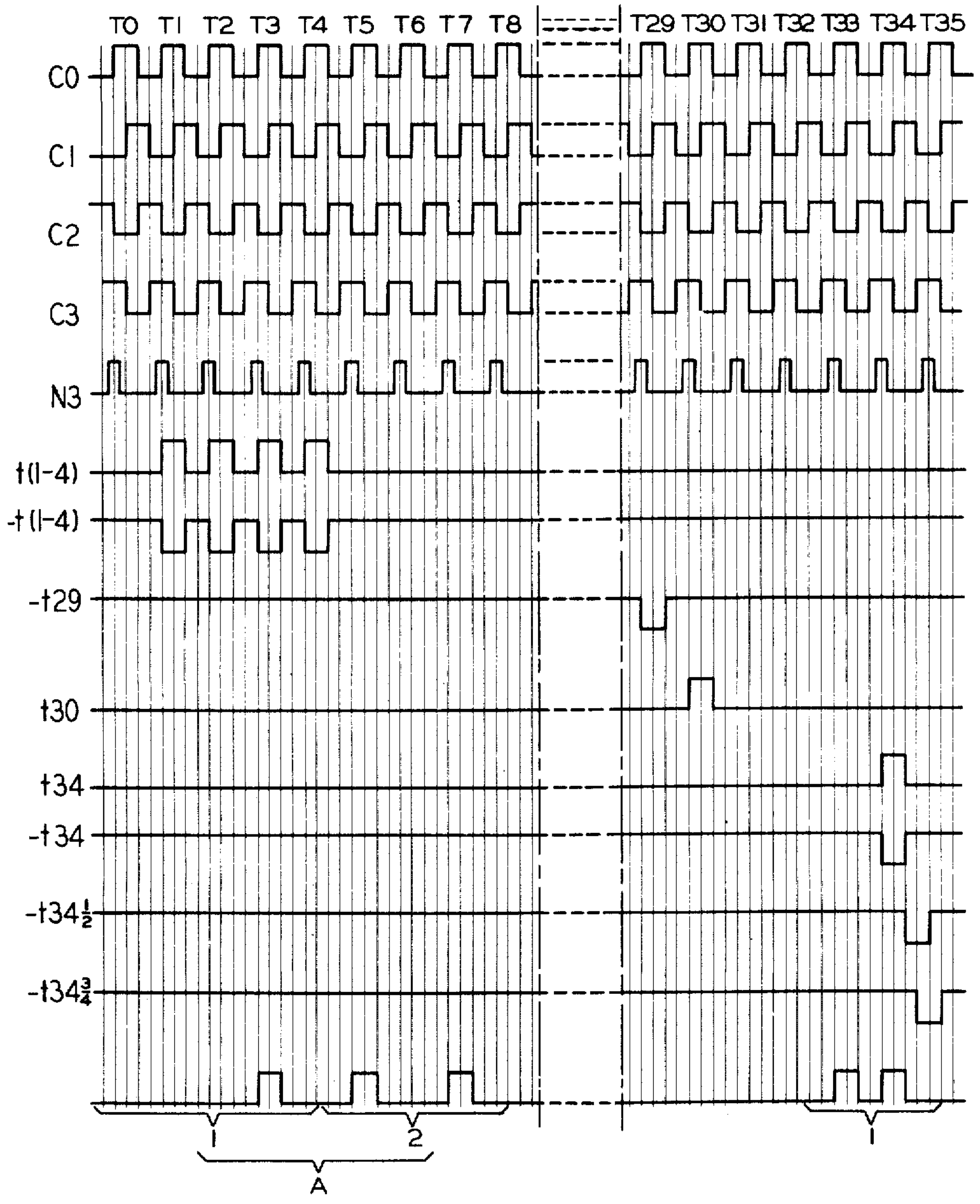

Fig. 3 diagrammatically illustrates the timing signals associated with the apparatus as well as the pattern of signals obtained during the operation of the apparatus shown in Fig. 1.

Figure 4:
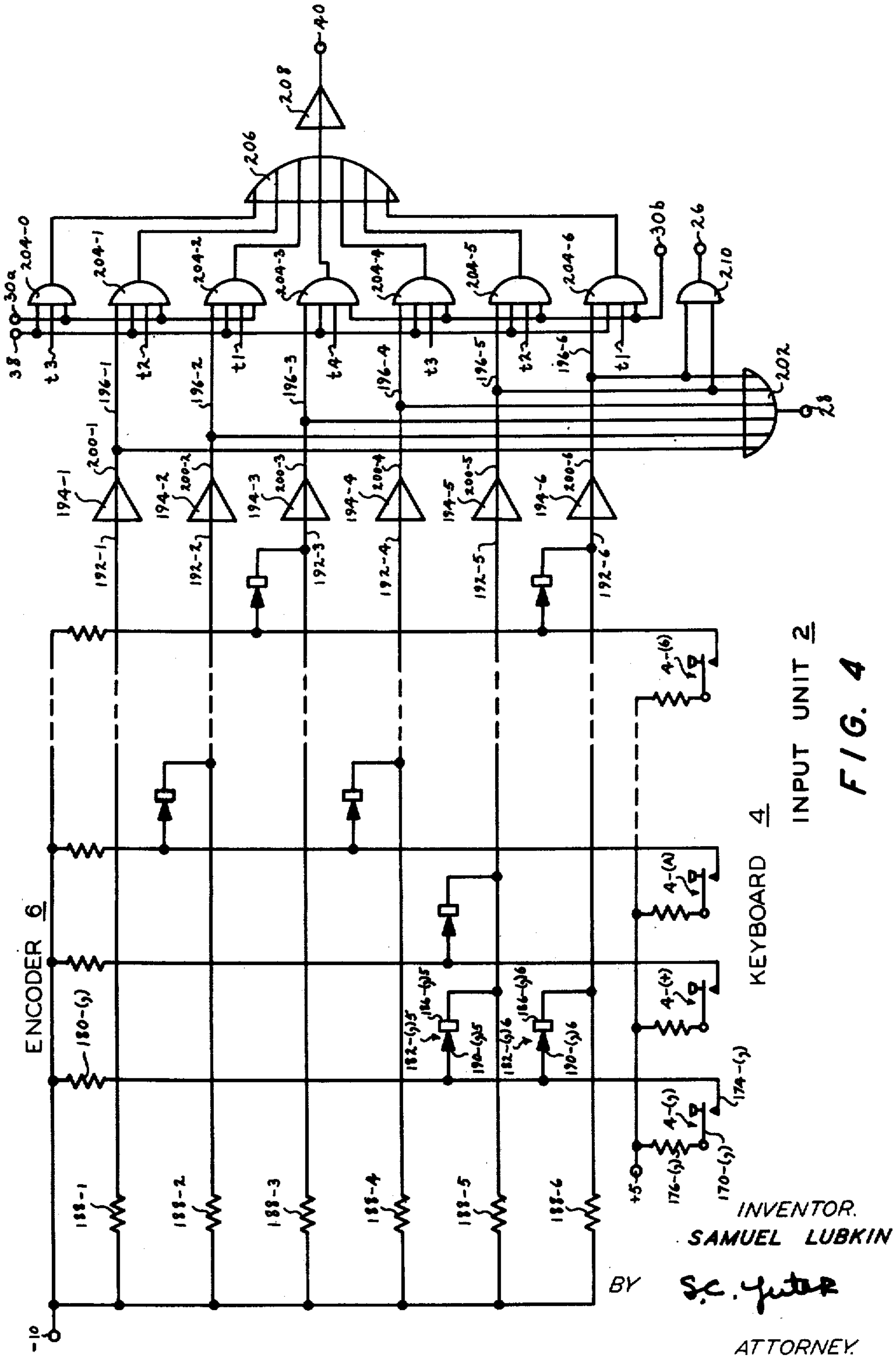

Fig. 4 is a schematic illustration of the encoder and keyboard portion of the input unit shown in Fig. 1.

Figure 5:
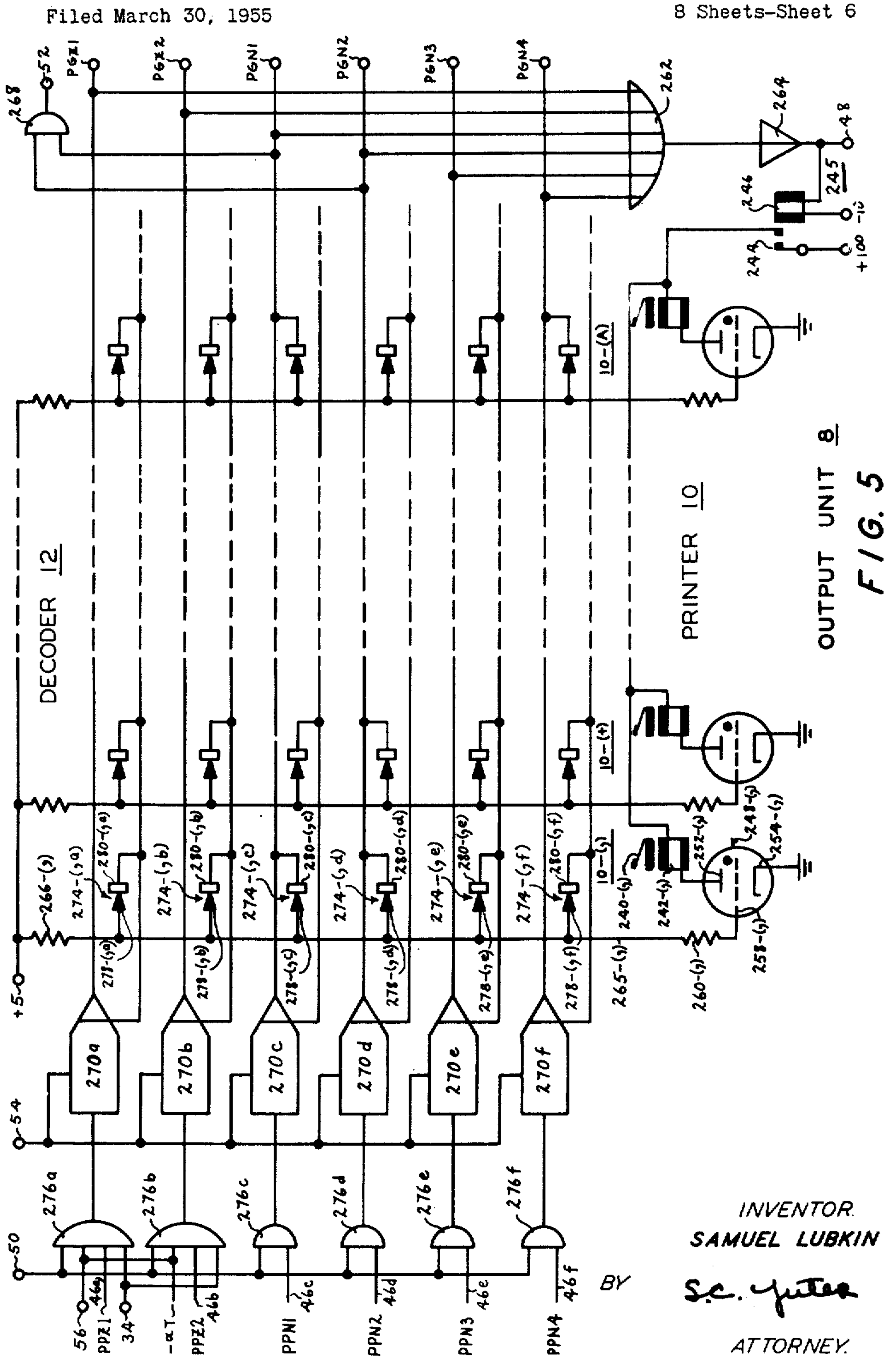

Fig. 5 is a diagrammatic illustration of the decoder and printer of the output unit which is shown in Fig. 1.

Figure 6:
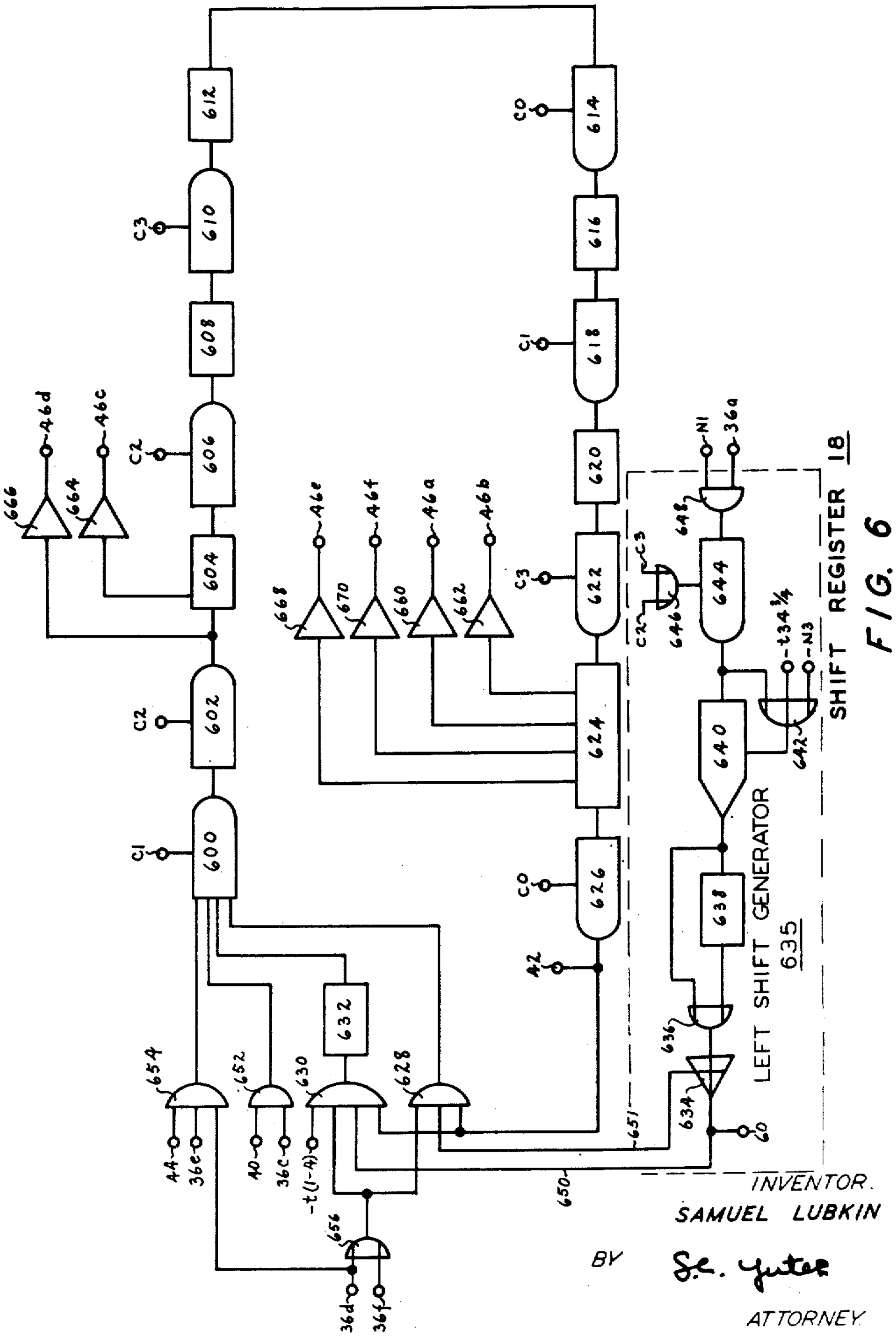

Fig. 6 is a schematic block diagram of the shift register which is shown in Fig. 1.

Figure 7:
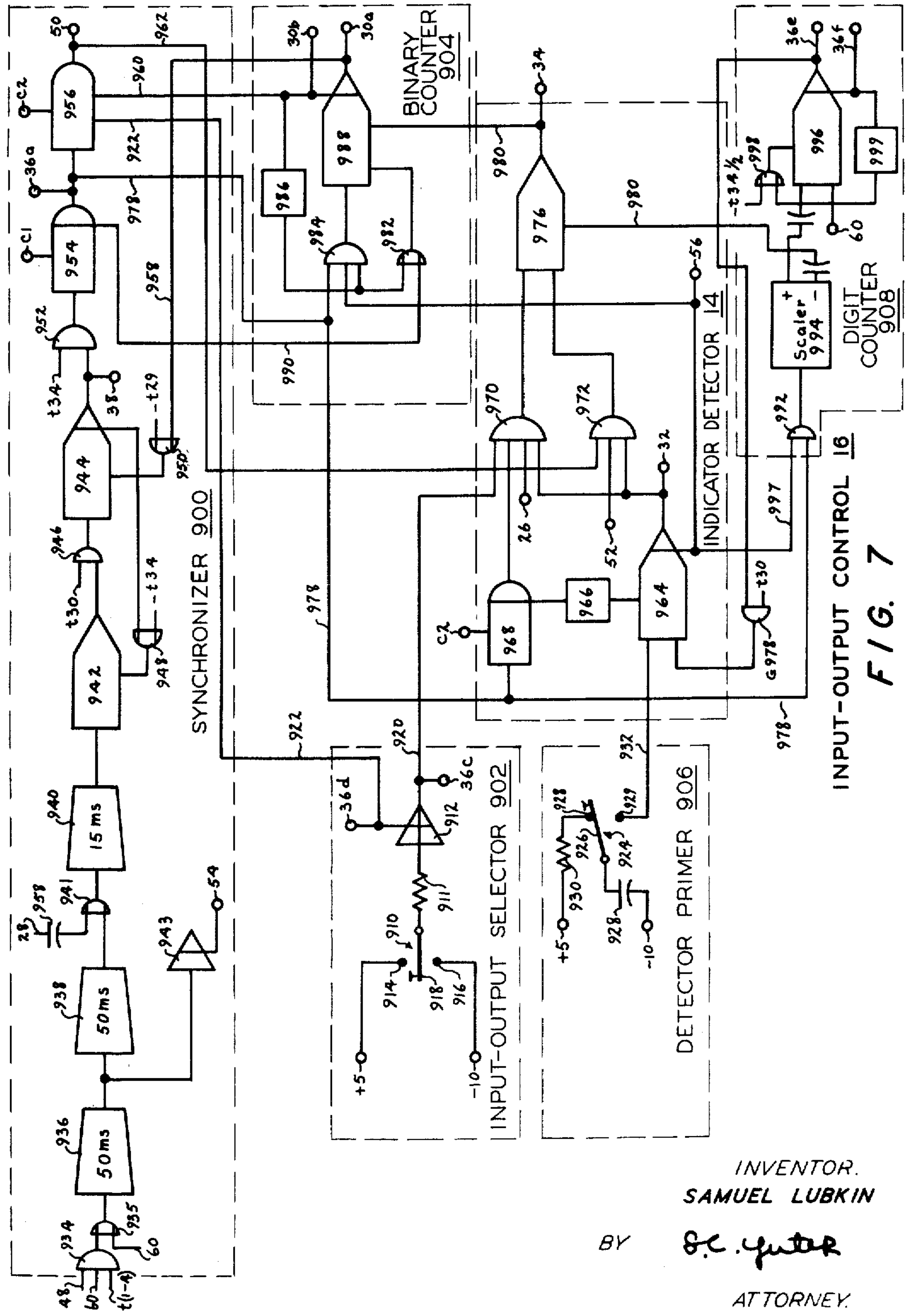

Fig. 7 is a block diagram of the input-output control and indicator detector which is illustrated in Fig. 1.

*General description of system*

Referring more particularly to the computer or data processor system shown in Fig. 1, which will be described in greater detail hereinafter, the diagram has been simplified to facilitate the description of the invention. The circuit leads between the numbered blocks are intended primarily to show the routing of the data and control signals, and ground leads have been deleted. The leads which carry the control signals have single arrowhead direction indicating markers. Data signal leads are mixed with double arrowheads to indicate the direction of flow of information.

For purposes of illustrating the operation of the invention, the so-called "excess three" code will be used to represent decimal digits in binary form. In this system a decimal digit N is represented by the binary number N+3; thus,

0=0011
1=0100
2=0101
3=0110
4=0111
5=1000
6=1001
7=1010
8=1011
9=1100

Therefore the decimal digit 3, for example, is represented by the four-bit group 0110 which normally equals 6. Stated otherwise, the electrical representation of the decimal digit 3 in the computer is: no pulse, pulse, pulse, no pulse.

The operation of the apparatus shown in Fig. 1 will first be described in connection with the insertion of an alphabetic word and then with the insertion of a numeric word. A word is entered via the input unit 2 and stored in the shift register 18 under control of the input-output control 16 and the indicator detector 14. The word is fed from the shift register 18 to the output unit 8 after being processed by the computer 25.

Initially the information is typed in normal sequence on the keyboard 4 of the input unit 2. The input unit 2 comprises the keyboard 4 and the encoder 6. The encoder 6 under control of the synchronizing circuits of the input-output control 16 converts the operation of a particular key of the keyboard 4 into either one four-pulse group or a pair of four-pulse groups.

The encoder 6 is coupled to the indicator detector 14 via the sign digit line 26, to the input-output control 16 by the encoder common line 28, the group control line 30 and the synchronized sampling line 38, and to the shift register 18 via the information input line 40.

The input-output control 16 is coupled to the indicator detector 14 via the priming line 32 and the alphabetic line 34. The input-output control 16 is also coupled to the shift register 18 via the register control cable 36 having a plurality of lines which feed control signals to the shift register 18.

At the beginning of the operation to insert information into the system a signal is generated in the input-output control 16 by actuating a switch (not shown). The signal is fed via priming line 32 to prepare the indicator detector 14 for receiving signals.

The indicator detector 14 tests whether or not the first digit of each word (the sign digit) is a comma. If a comma is detected the indicator detector 14 generates a signal which is fed to the input-output control 16 via the alphabetic line 34. This signal causes the synchronizing circuits of the input-output control 16 to generate two sequential sets of synchronizing signals per character inserted. If no comma is detected then the indicator detector 14 does not feed a signal to the input-output control 16 and only one set of synchronizing signals are generated per character inserted.

A second signal controlled by a switch (not shown) in the input-output control 16 is fed via lines of the register control cable 36 to prepare the shift register 18 for receipt of information from the encoder 6.

The shift register 18 is a recirculating device capable of storing nine digits in the form of signals. The digits circulate in the shift register 18 as a temporal distribution of pulse groups. The digits are arranged such that the least significant digit occurs first in time. Provisions are made so that the entire group of digits can be precessed one digit at a time. During the precessing operation hereinafter called a shift left, the digit occupying the least significant digit position is shifted to occupy the second least significant digit position, etc. In other words, each digit is shifted up one order in significance. The digit occupying the most significant digit position is deleted. It should be noted that as a result of the shift left the least significant digit position is cleared since nothing was shifted into this position while the digit that occupied the position was shifted out.

The shift register 18 can receive information from either the encoder 6 or the memory 24 of the computer 25. It is therefore necessary to select either of these sources of information during an operation.

With the indicator detector 14 primed and the shift register 18 prepared to receive information, the sign digit of the first word of the data is typed into the keyboard 4. The digit is then encoded by the encoder 6. The signals of the encoded digit are fed via the sign digit line 26 to the indicator detector 14. The indicator detector 14 tests whether the sign digit is a comma (,) indicating the word is to be handled alphabetically, or is not a comma (,) indicating that the word is to be handled numerically.

At the same time another signal is fed from the encoder 6 via the encoder common line 28 to the input-output control 16. This signal is generated when any key of the keyboard 4 is actuated. This signal is used to initiate the generation of synchronizing signals in the input-output control 16. The synchronizing signals are fed via lines of the register control cable 36 to cause a one digit left shift to occur in the shift register 18.

Following the left shift, a sampling signal is fed from the input-output control 16 via the synchronized sampling line 38 to the encoder 6. The sampling signal permits the encoder 6 to pass the sign digit of the word as a group of serially arranged pulses to the cleared digit position of the shift register 18 via the information input line 40. The priming signal is now removed from the indicator detector 14 thus restricting the test only to the sign digit. The insertion of the sign digit is identical for both alphabetic and numeric words. The apparatus handles the remaining characters differently depending on the significance of the sign digit.

A sampling signal is then fed to the encoder 6 via the synchronized sampling line 38 causing a four-pulse group to be transferred from the encoder 6 via information input line 40 to the shift register 18. A signal via group control line 30 then again alerts the encoder 6 for the transfer of information. A second shift left is generated by the input-output control 16 and a second sample signal is fed to the encoder 6 via synchronized sampling line 38. The second four-pulse group is then inserted into the shift register 18 via the information input line 40. The signal present on the group control line 30 terminates. The input-output control 16 returns to its initial condition awaiting the insertion of the second alphabetic character.

A count is kept by the input-output control 16 of the number of left shifts which occur after the insertion of the sign digit. At the end of the eighth left shift indicating that four alphabetic characters and the sign digit have been inserted, a counter in the input-output control 16 generates a signal which causes the information now stored in the shift register 18 to enter the memory 24 via the memory input line 42. The same signal is also used to reprime the indicator detector 14.

The insertion of a numeric word proceeds as follows:

Since the word is numeric a comma (,) is not present in the sign digit position of the word and the indicator detector 14 does not feed a control signal to the input-output control 16 via the alphabetic line 34. As each succeeding character is typed a single shift left occurs in the shift register 18 and a single sampling signal is fed to the encoder 6 via the synchronized sampling line 38. Therefore, for each character inserted a single four-pulse group is transferred to the shift register 18 via the information input line 40. After the insertion of eight numeric characters, eight shift lefts have occurred and the counter in the input-output control 16 performs its usual function of transferring the information in the shift register 18 to the memory 24 via information input line 42 and of repriming the indicator detector 14.

During an output operation information is drawn from the memory 24 a word at a time and fed to the shift register 18. When a word is completely loaded in the shift register 18 the digits of the word in the shift register 18 are sequentially fed via the cable 46 to the decoder 12 for activating the printer 10.

The memory 24 is coupled to the shift register 18 via the memory output line 44. The shift register 18 is coupled to the decoder 12 via a plurality of lines making up the code 46. The decoder 12 is coupled to the indicator detector 14 via the sign bit line 52 and to the input-output control 16 via the decoder common bit line 48. Control signals are fed via the alphabetic line 34 from the indicator detector 14 to the decoder 12.

The printing out of the sign digit will be described first. Under control of the computer control 22 of the computer 25 the apparatus is set up for an output operation. This is equivalent to operating a switch (not shown) to prepare the shift register 18 for receiving words from the memory 24 to initially prime the indicator detector 14 and to generate a trigger signal for the first synchronizing signal in the input-output control 16. The succeeding trigger signals are received from the decoder 12 via the decoder common bit line 48.

With the indicator detector 14 primed and the word to be typed out entered into the shift register 18, the type-out operation can be considered to start with the occurrence of the first trigger signal. The trigger signal generates a sampling signal in the input-output control 16 which is fed via the detector sampling line 50 to the decoder 12 for sampling the signals fed from the shift register 18 via the lines of the cable 46. The sampling of these signals causes the activation of the appropriate character actuator of the printer 10. The first character (the sign digit) generates a signal in the decoder 12 which is fed via sign bit line 52 to the indicator detector 14 to test whether this character is a comma (,). Immediately after the typing of the sign digit by the printer 10 the indicator detector 14 is unprimed, thus restricting the test for alphabetic information to only the sign digit position. At the same time a signal is fed via one of the lines of the register control cable 36 causing a one digit left shift in the shift register 18.

The type-out of the sign digit position is the same for both alphabetic and numeric words. The apparatus handles the remaining characters differently depending on whether the sign digit indicated alphabetic or numeric information.

The type-out of alphabetic information will be described first. The first digit typed out will therefore be a comma (,) and a signal representing this comma will be fed via the sign bit line 52 to the indicator detector 14 causing the generation of an alphabetic control signal by the indicator detector 14. The alphabetic signal is fed via the alphabetic line 34 to the input-output control 16 and to the decoder 12. At the same time a trigger signal is fed to the input-output control 16 via the decoder sampling line 50. This trigger signal causes the generation of a control signal which is fed to the shift register 18 via one of the lines of the register control cable 36. The control signal initiates two sequential digit left shifts in the shift register 18.

The trigger signal also causes the input-output control 16 to generate a synchronized sampling signal which is then fed via the decoder sampling line 50 to the decoder 12 where cooperating with the alphabetic control signal on the alphabetic line 34 a two digit decoding of the signals present on the lines of the cable 46 occurs.

After four such two digit decodings, eight left shifts have occurred and a counter in the input-output control 16 generates a signal causing a new word to be fed from the memory 24 via the memory output line 44 to the shift register 18. At the same time, the word previously occupying the shift register 18 is cleared. The counter in the input-output control 16 also generates the signal for repriming the indicator detector 14 preparatory to typing out a new word.

During the numeric type-out the indicator detector 14 will not generate an alphabetic control signal hence no signal will be present on the alphabetic line 34. As each character is now typed out only one left shift will occur per character and therefore eight characters will be typed out before the counter in the input-output control 16 causes the transfer of a new word from the memory 24. The absence of the alphabetic control signal fed to the decoder 12 via the alphabetic line 34 only permits the decoder 12 to sample for numeric characters.

In summary, all data is handled in accordance with the following steps:

Step 1. The assembling of each character of a word as one or two code groups as directed by an indicator that is the first character of the word.

Step 2. The handling of the word as one complete unit after the word has been assembled into an assortment of code groups.

Step 3. The decoding of the code groups singly or in pairs as directed by an indicator code group which is part of the word.

It should be noted that the same method can be used with punched cards in an accounting system as well as in preparing punched paper tapes or magnetic tapes.

Therefore, as a result of the invention mixed alphabetic and numeric information can be handled by a data processor in a highly efficient manner.

When the information being processed is primarily numeric the saving in use of the storage capacity is very great, since most of the words stored will contain a high density of information per unit of storage capacity.

*Description of symbols*

For convenient reference, all positive and negative voltage supply buses will hereinafter be identified with a number corresponding with their voltage.

A principal feature of an electronic digital computer is the ability to switch signals rapidly from one component of the computer to another. Electronic gates of the coincidence type are frequently used as switches to govern the passage of one signal by the presence of one or more other signals which control the operation of the gate. Fig. 2 illustrates the table of symbols which will be employed to simplify the detailed explanation of the invention.

*Gate*

The gates used in the apparatus are of the "coincidence" type, each comprising a crystal diode network which functions to receive input signals via a plurality of input terminals and to pass the most negative signal.

The symbol for a representative gate 1022, having two input terminals 1024, and 1026, is shown in Fig. 2*a*. The signal potential levels are assumed to be plus five volts (positive signals) and minus ten volts (negative signals), thus the potentials of the signals which may exist at the input terminals 1024 and 1026 are thereby limited to these values.

If a potential of minus ten volts is present at one or both of the input terminals 1024 and 1026, a potential of minus ten volts exists at the output terminal 1044. Therefore, if one of the input signals to the input terminals 1024 and 1026 is positive and the other signal is negative, the negative signal is passed and the positive signal is "blocked."

When there is a coincidence of positive signals at the two input terminals 1024 and 1026, a positive signal is transmitted from the output terminal 1044. In such case, it may be stated that a positive signal is "gated" or "passed" by the gate 1022.

The schematic details of the gate 1022 are shown in Fig. 2*b*. Gate 1022 includes the crystal diodes 1028 and 1030. Each of the input terminals 1024 and 1026 is coupled to one of the crystal diodes 1028 and 1030. Crystal diode 1028 comprises the cathode 1032 and the anode 1034. Crystal diode 1030 comprises the anode 1038 and the cathode 1036. More particularly, the input terminals 1024 and 1026 are respectively coupled to the cathode 1032 of the crystal diode 1028 and the cathode 1036 of the crystal diode 1030. The anode 1034 of the crystal diode 1028 and the anode 1038 of the crystal diode 1030 are interconnected at the junction 1040. The anodes 1034 and 1038 are coupled via the resistor 1042 to the positive voltage bus 65.

If negative potentials are simultaneously present at the input terminals 1024 and 1026, both of the crystal diodes 1028 and 1030 conduct, since the positive supply bus 65 tends to make the anodes 1034 and 1038 more positive. The voltage at the junction 1040 will then be minus ten volts since, while conducting, the anodes 1034 and 1038 of the crystal diodes 1028 and 1030 assume the potential of the associated cathodes 1032 and 1036.

When a positive signal is fed only to the input terminal 1024, the cathode 1032 is raised to a positive five volts potential and is made more positive than the anode 1034, so that crystal diode 1028 stops conducting. As a result, the potential at the junction 1040 remains at the negative ten volts level. In a similar manner, when a positive signal is only present at the input terminal 1026, the voltage at the junction 1040 will not be changed.

When the signals present at both input terminals 1024 and 1026 are positive, the anodes 1034 and 1038 are raised to approximately the same potential as their associated cathodes 1032 and 1036 and the potential at the junction 1040 rises to a positive potential of five volts.

The potential which exists at the junction 1040 is transmitted from the gate 1022 via the connected output terminal 1044.

In the above described manner, the gate 1022 is frequently used as a switch to govern the passage of one signal by the presence of one or more signals which control the operation of the gate 1022.

It should be understood that the potentials of plus five volts and minus ten volts used for purpose of illustration are approximate, and the exact potentials will be affected in two ways. First, they will be affected by the value of the resistance 1042 and its relation to the impedances of the input circuits connected to the input terminals 1024 and 1026. Second, they will be affected by the fact that a crystal diode has some resistance (i. e., is not a perfect conductor) when its anode is more positive than its cathode, and furthermore will pass some current (i. e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 1044 to prevent the terminal from becoming more negative than a predetermined voltage level to protect the diodes 1028 and 1030 against excessive back voltages and to provide the proper voltage levels for succeeding circuits.

Although the gate 1022 is shown having only the two input terminals 1024 and 1026 it should be realized that several additional input terminals are possible. Each of the additional input terminals is coupled by its own diode to the junction 1040 and the gate still functions in the above described manner but now is also dependent on the signals present at the added input terminals.

*Buffer*

The buffers used in the apparatus are also known as "or" gates. Each buffer comprises a crystal diode network which functions to receive input signals via a plurality of input terminals and to pass the most positive signal.

The symbol for a representatve buffer 1046, having two input terminals 1048 and 1050, is shown in Fig. 2*c*. Since the signal potential levels in the system are minus ten volts and plus five volts, either one of these potentials may exist at the input terminals 1048 and 1050.

If a positive potential of five volts exists at one or both of the input terminals 1048 or 1050, a positive potential of five volts exists at the output terminal 1068. If a negative potential of ten volts is present at both of the input terminals 1048 and 1050, a negative potential of ten volts will be present at the output terminal 1068.

The schematic details of the buffer 1046 are shown in Fig. 2*d*. The buffer 1046 includes the two crystal diodes 1052 and 1054. The crystal diode 1052 comprises the anode 1056 and the cathode 1058. Crystal diode 1054 comprises the anode 1060 and the cathode 1062. The anode 1056 of the crystal diode 1052 is coupled to the input terminal 1048. The anode 1060 of the crystal diode 1054 is coupled to the input terminal 1050. The cathodes 1058 and 1062 of the crystal diodes 1052 and 1054, respectively, are joined at the junction 1064 which is coupled to the output terminal 1068, and via the resistor 1066 to the negative supply bus 70. The negative supply bus 70 tends to make the cathodes 1058 and 1062 more negative than the anodes 1056 and 1060, respectively, causing both crystal diodes 1052 and 1054 to conduct.

When negative ten volt signals are simultaneously present at input terminals 1048 and 1050, the crystal diodes 1052 and 1054 are conductive, and the potential at the cathodes 1058 and 1062 approaches the magnitude of the potential at the anodes 1056 and 1060. As a result, a negative potential of ten volts appears at the output terminal 1068.

If positive five volt signals are fed simultaneously to both input terminals 1048 and 1050, a positive potential of five volts appears at the output terminal 1068, since both crystal diodes 1052 and 1054 will remain conducting. Thus the buffer 1046 functions to pass the most positive signal received via the input terminals 1048 and 1050.

Although the buffer 1046 is shown with only the two input terminals 1048 and 1050 it should be noted that there can be more input terminals. Each of the input terminals is coupled to the junction 1064 by a diode.

*Delay line*

The symbol for a representative electrical delay line 1070 which is a lumped parameter type delay line and which functions to delay received pulses for discrete periods of time, is shown in Fig. 2*e*.

The delay line 1070 comprises the input terminal 1072, the output terminal 1088, and a plurality of taps 1080, 1082 and 1084. A pulse which is fed via the input terminal 1072 to the delay line 1070 will be delayed for an increasing number of pulse times before successively appearing at the taps 1080, 1082 and 1084. When the pulse reaches the output terminal 1088, the total delay provided by the delay line 1070 has been applied. In the text which follows, the specific number of pulse-times delay which is encountered before a pulse travels from the input terminal to a tap of the delay line will be stated.

The delay line 1070 shown in Fig. 2*f* comprises a plurality of inductors 1076 connected in series, with the associated capacitors 1078 which couple a point 1074 on each inductor 1076 to ground. A signal is fed into the delay line 1070 at the input terminal 1072 and the maximum delay occurs at the output terminal 1088. The taps 1080, 1082 and 1084 are each connected to one of the points 1074 and provide varied delays. The delay line 1070 is terminated by a resistor 1086 in order to prevent reflections. Although in the delay line of Fig. 2*f* a tap is shown connected to each of the points 1074, it should be understood that in actual practice there are ordinarily several untapped points 1074 between successive taps.

*Pulse amplifier*

The symbol for a representative pulse amplifier is shown in Fig. 2*g*. When a positive pulse is fed to the pulse amplifier 1090 via the input terminal 1092, the pulse amplifier 1090 functions to transmit a positive pulse which swings from minus ten to plus five volts from its positive output terminal 1124, and a negative pulse which swings from plus five to minus ten volts from its negative output terminal 1126. At all other times, the pulse amplifier 1090 has a negative potential of ten volts at its positive output terminal 1124 and a positive potential of five volts at its negative output terminal 1126.

The detailed circuitry of the pulse amplifier 1090 is shown in Fig. 2*h*. The pulse amplifier 1090 includes the vacuum tube 1108, the pulse transformer 1116 and associated circuitry. The vacuum tube 1108 comprises the cathode 1114, the grid 1112 and the anode 1110. The pulse transformer comprises the primary winding 1118 and the secondary windings 1120 and 1122.

The crystal diode 1094 couples the grid 1112 of the vacuum tube 1108 to the input terminal 1092, the anode 1096 of the crystal diode 1094 being coupled to the input terminal 1092, and the cathode 1098 being coupled to the grid 1112. The negative supply bus 70 is coupled to the grid 1112 via the resistor 1100 and tends to make the crystal diode 1094 conductive. The grid 1112 and the cathode 1098 of the crystal diode 1094 are also coupled to the cathode 1104 of the crystal diode 1102, whose anode 1106 is coupled to the negative supply bus 5. The crystal diode 1102 clamps the grid 1112 at a potential of minus five volts thus preventing the voltage applied to the grid 1112 from becoming more negative than minus five volts.

When a voltage more positive than minus five volts is transmitted to the input terminal 1092, the crystal diode 1094 conducts and the voltage is applied to the grid 1112. Since the crystal diode 1102 clamps the grid 1112 and the cathode 1098 of the crystal diode 1094 at minus five volts, any voltage more negative than minus five volts will cause the crystal diode 1094 to become nonconductive, and that input voltage will be blocked at the crystal diode 1094. Thus, the clamping action of the crystal diode 1102 will not affect the circuitry which supplies the input voltage.

The cathode 1114 of the vacuum tube 1108 is connected to ground potential. The anode 1110 of the vacuum tube 1108 is coupled by the primary winding 1118 of the pulse transformer 1116 to the positive supply bus 250. The outer ends of the secondary windings 1120 and 1122 of the pulse transformer 1116 are coupled respectively to the positive output terminal 1124 and the negative output terminal 1126. The inner ends of the secondary windings 1120 and 1122 are coupled respectively to the negative supply bus 10 and the positive supply bus 5.

A positive pulse which is fed to the grid 1112 of the vacuum tube 1108 will be inverted at the primary winding 1118 of the pulse transformer 1116 which is wound to produce a positive pulse in the secondary winding 1120 and a negative pulse in the secondary winding 1122. These pulses respectively drive the positive output terminal 1124 up to a positive five volts potential and the negative output terminal 1126 down to a negative ten volts potential because of the circuit parameters.

When the vacuum tube 1108 is nonconducting, the negative ten volts potential is fed through the secondary winding 1120 and appears at the positive output terminal 1124. At the same time, the positive five volts potential is fed through the secondary winding 1122 to the negative output terminal 1126. These latter conditions are the normally existing conditions at the output terminals 1124 and 1126.

*D.-C. amplifier*

The symbol for a representative D.-C. amplifier 1148 is shown in Fig. 2*i*. When a postive signal is present at the input terminal 1150, a positive signal of five volts appears at the positive output terminal 1236 and a negative signal of ten volts is present at the negative output terminal 1238. If a negative potential is present at the input terminal 1150, the potentials at the output terminals 1236 and 1238 are reversed.

As shown in Fig. 2*j*, the D.-C. amplifier 1148 includes the gate 1154, the buffer 1156, the vacuum tube 1160, the transformer 1183, the full-wave rectifiers 1186 and 1188, and the filters 1220 and 1214.

The input terminal 1150 is connected to one input terminal of the gate 1154. The other input of the gate 1154 is fed a one megacycle carrier signal from the signal generator 1152 which is a signal generator of known type. The megacycle carrier signal swings from minus ten to plus five volts.

One input of the buffer 1156 is connected to the output of the gate 1154. The other input of the buffer 1156 is connected to the negative supply bus 5. The buffer 1156 couples the output of the gate 1154 to the control grid 1170 of the vacuum tube 1160.

The vacuum tube 1160 is a five element tube having a grounded cylindrical shield 1164, and includes the anode 1162 connected via the primary winding 1182 of the transformer 1183 to a positive supply bus 250. The junction of the positive supply bus 250 and the primary winding 1182 is coupled via the capacitor 1184 to ground. The vacuum tube 1160 also includes the suppressor grid 1166 which is connected to ground, the screen grid 1168 which is connected to the positive supply bus 125 and via the capacitor 1158 to ground, and the cathode 1172 which is grounded.

The anode 1162 of the vacuum tube 1160 is also connected via the coupling capacitor 1174 to the neon tube 1176 which is grounded. The capacitor 1180 is connected in parallel with the primary winding 1182 of the transformer 1183 to form the parallel tank circuit 1178 which is tuned to the frequency of the carrier signal.

The full-wave rectifier 1186 is connected to the secondary winding 1191 having its center tap 1187 connected to the negative supply bus 10. The full-wave rectifier 1186 includes the pair of crystal diodes 1190 and 1196. The anodes 1192 and 1198 of the crystal diodes 1190 and 1196 are respectively coupled to opposite ends of the secondary winding 1191 of the transformer 1183, and the cathodes 1194 and 1200 of the crystal diodes 1190 and 1196 are interconnected.

The full-wave rectifier 1188 is connected to the secondary winding 1193 having its center tap 1189 connected to the positive supply bus 5.

The full-wave rectifier 1188 includes the pair of crystal diodes 1202 and 1208. The cathodes 1204 and 1210 of the crystal diodes 1202 and 1208 are coupled to opposite ends of the secondary winding 1193, and the anodes 1206 and 1212 of the crystal diodes 1202 and 1208 are connected together.

The filter 1220 which couples the cathodes 1194 and 1200 of the crystal diodes 1190 and 1196 to the positive output terminal 1236 is a parallel tank circuit which includes the capacitor 1224 and the inductor 1222. The capacitor 1226 connects the positive output terminal 1236 to the negative supply bus 10. The positive output terminal 1236 is also coupled via the resistor 1230 to the negative supply bus 70.

The filter 1214, which couples the anodes 1206 and 1212 of the crystal diodes 1202 and 1208 to the negative output terminal 1238, is a parallel tank circuit which includes the capacitor 1218 and the inductor 1216. The capacitor 1228 connects the negative output terminal 1238 to the positive supply bus 5. The negative output terminal 1238 is also coupled by the resistor 1234 to the positive supply bus 65.

Initially, the crystal diodes 1190 and 1196 are in a conductive state such that the potential at the positive output terminal 1236 is approximately minus ten volts. Similarly, the crystal diodes 1202 and 1208 are initially in a conductive state such that the potential at the negative output terminal 1238 is approximately plus five volts.

When a signal is fed to the input terminal 1150 it is combined with the one megacycle carrier and fed to the buffer 1156. As previously noted, one input terminal of the buffer 1156 is connected to a negative five volts supply bus so that all signals at the output of gate 1154 which are equal to or more positive than minus five volts will be passed by the buffer 1156. A signal passed by the buffer 1156 is applied to the control grid 1170 of the vacuum tube 1160. The signal is amplified by vacuum tube 1160 and appears across the parallel tank circuit 1178. The parallel tank circuit 1178 is tuned to the frequency of the incoming signal so that the maximum signal will be passed by the parallel tank circuit 1178 to the full-wave rectifiers 1186 and 1188.

The full-wave rectifier 1186 delivers a positive signal which is then filtered by the filter 1220 to appear as a positive direct-current potential of approximately five volts at the positive output terminal 1236. The full-wave rectifier 1188 delivers a negative signal which is then filtered by the filter 1214 to appear as a negative direct-current potential of approximately ten volts at the negative output terminal 1238.

Thus, if a positive signal is present at the input terminal 1150, the voltage at the positive output terminal 1236 is plus five volts, and the potential at the negative output terminal 1238 is minus ten volts. However, if no signal is present at the input terminal 1150, the voltage at the positive output terminal 1236 will be minus ten volts, and the potential at the negative output terminal 1238 will be plus five volts.

Generally, it should be noted that this D.-C. amplifier is a carrier type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

Reshaper

A reshaper of the type used in the apparatus is an electronic circuit which functions to reshape and retime positive pulses which have become poorly shaped and attenuated.

The symbol for a representative reshaper 1128 is illustrated in Fig. 2*h* and comprises one or more input terminals of which the input terminals 1130 and 1131 are shown, timing terminal 1138 which receives reshaping and retiming pulses (also designated clocking or C pulses), positive output terminal 1144, negative output terminal 1146, and blocking terminal 1136 through which signals may be sent to make the reshaper 1128 inoperative.

Except when positive pulses are fed to the input terminals 130 or 1131 of the reshaper 1128, a negative potential of ten volts is present at the positive output terminal 1144 and a positive potential of five volts exists at the negative output terminal 1146.

When a pulse is fed to the reshaper 1128 via one or both of the input terminals 1130 and 1131, the pulse is reshaped by a clock pulse (received via the terminal 1138), which is timed to delay the reshaped pulse for one-quarter of a pulse time, and is then transmitted from the reshaper 1128 via the positive output terminal 1144. While the positive pulse is being transmitted from the positive output terminal 1144, a negative pulse is transmitted from the negative output terminal 1146.

The detailed circuitry of the reshaper 1128 is illustrated in Fig. 2*l* in which use is made of logical symbols previously described.

The reshaper 1128 comprises the buffer 1132, the gate 1134 and the pulse amplifier 1142 connected in series. A positive pulse which is fed via one or both of the input terminal 1130 and 1131 of the buffer 1132 is passed to the gate 1134. Signals may also be fed via the blocking terminal 1136 to the gate 1134 and if the signal is negative, the gate 1134 is blocked and the reshaper 1128 is inoperative. The blocking terminal 1136 is generally absent and if present usually receives a positive signal.

A series of identical clock pulses which are generated in the clock pulse generator, as will later be described, are transmitted to the gate 1134 via the clock terminal 1138. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 1134. Since in many cases the pulse to be reshaped is originally produced by a previous reshaper and thus has approximately the same width as a clock pulse, its center point will be one-quarter pulse time later than the leading edge of the clock pulse which previously reshaped it. Hence its leading edge after passing through the new reshaper will be one-quarter pulse time later than before, and on this basis it may be said that a reshaper introduces a one-quarter pulse time delay in the signals passing through it.

When the attenuated positive pulse reaches its full magnitude at the gate 1134, the coinciding clock pulse is gated through to the amplifier 1142 and is amplified and causes a positive pulse to be transmitted from the positive output terminal 1144, and a negative pulse to be transmitted from the negative output terminal 1146 at the same time.

The positive output terminal 1144 is also coupled to one input of the buffer 1132 so that a positive signal which appears at the positive output terminal 1144 is regenerative and will continue to exist until the clock pulse terminates at the gate 1134. This effectively permits the entire clock pulse to be gated through the gate 1134, even though the original pulse has decayed before the end of the clock pulse.

Stated more generally, a clock pulse is passed through the gate 1134 from the earliest coincidence of that clock pulse with the full magnitude of the attenuated pulse until the termination of that clock pulse. As a result, a clock pulse is substituted for the attenuated pulse in the system after a delay of one-quarter of the pulse time.

Flip flop

A flip flop of the type used in the apparatus is a bistable electronic circuit with two output terminals, one of which is maintained at one potential level and the other of which is maintained at a second potential level to indicate one stable state. Upon receipt of a signal of suitable magnitude at its input the potential levels of the two output terminals are interchanged to indicate a second stable state.

The symbol for a representative flip flop 1240 is illustrated in Fig. 2*m*. The flip flop 1240 comprises the input terminal 1242, two reset terminals 1251, 1253, positive output terminal 1254, and negative output terminal 1256.

One stable state of the flip flop 1240 is the normal condition which is designated "reset" and exists when a negative potential of ten volts appears at the positive output terminal 1254 and a positive potential of five volts appears at the negative output terminal 1256. The second stable state is designated "set" and exists when a positive potential of five volts appears at the positive output terminal 1254 and a negative potential of ten volts appears at the negative output terminal 1256.

The flip flop 1240 is set when a positive input signal is received via its input terminal 1242, except when a reset signal is simultaneously transmitted to the reset terminals 1251 or 1253 of the flip flop 1240.

Once set, the flip flop remains set as long as positive signals are received via the reset terminal 1251 even though the "setting" pulse or signal has terminated. When the signal received via a reset terminal such as 1251 becomes negative, the flip flop 1240 is reset.

Stated more generally, the flip flop 1240 is set by the receipt of a positive input signal via the input terminal 1242 and is reset by at least one reset signal. After being reset, the flip flop 1240 remains reset until the above recited set conditions are fulfilled.

The detailed circuitry of the flip flop 1240 is illustrated in Fig. 2*n* employing some of the logical symbols previously described.

The flip flop 1240 comprises the buffer 1246, the D.-C. amplifier 1252 and the gate 1248.

The input terminal 1242 is the input terminal of the buffer 1246. A positive signal which is transmitted to the input terminal 1242 is passed through the buffer 1246 to the D.-C. amplifier 1252 via the gate 1248, and causes the D.-C. amplifier 1252 to generate a positive potential of five volts at its positive output terminal 1254 and a negative potential of ten volts at its negative output terminal 1256.

The gate 1248 couples the output terminal of the buffer 1246 to input terminal of the D.-C. amplifier 1252. When a positive signal is present at the reset terminals 1251 and 1253, the gate 1248 can pass a positive signal from the buffer 1246 to the input terminal of the D.-C. amplifier. Thus a feedback path is provided which enables the positive potential of five volts to be maintained at the positive output terminal 1254 and which is blocked only when a negative signal causes the gate 1248 to be blocked.

It should be noted that a reset signal which causes the gate 1248 to be blocked will prevent a set signal at the buffer 1246 from causing the D.-C. amplifier 1252 to generate a positive potential of five volts at its positive output terminal 1254 during the existence of the set signal.

The invention will be described in detail in connection with timing signals which are generated by the timing unit 20.

The timing unit 20 is used to synchronize the basic units of the apparatus with each other and with the computer. The timing unit 20 therefore generates several series of periodically occurring pulse waveforms. The timing unit 20 usually comprises two elements called the clock which generates clock signals and the cycling unit which generates timing signals hereinafter called *t* signals.

Referring to the signals illustrated in Fig. 3, the C0, C1, C2, C3, and N3 clock signals are generated by the clock. As is shown, the C0 signal is a square wave signal of constant frequency. The period of the square wave signal indicates the basic pulse time of the apparatus. Hereinafter, whenever units of delay are indicated as pulse times each pulse time of delay is equal to one C0 pulse period.

The C1 signal is a square wave signal of the same frequency and amplitude as the C0 signal. As is shown in Fig. 3 the C1 signal is delayed a quarter pulse time with respect to the C0 signal.

The C2 and C3 signals are each square wave signals of the same frequency and amplitude as the C0 signal but are delayed one-half of a pulse time respectively with respect to the C0 signal.

The N3 signal is a periodic pulse signal having the same period as the C0 signal. Each pulse duration is one quarter of the C0 period. Each pulse of the N3 signal is centered in the positive portion of the C3 square wave.

The cycling unit generates a series of periodically occurring pulses. A typical signal is the *t*30 pulse signal. These pulses occur once every thirty-six pulse times. Thirty-six pulse times correspond to the time duration of a word. The time duration is sometimes called a minor cycle. Each of the thirty-six pulse times is usually associated with a particular bit position of the word and in a sense the signal description usually designates the corresponding bit position of the word.

The timing is so synchronized that information leaving the memory is always timed such that the least significant bit exists at time *t*1.

The timing unit 20 may be a circuit similar to that illustrated in the Proceedings of the I. R. E., January 1952, volume 40, Number 1, in the article entitled "The Binac" by Auerbach, Eckert, Shaw, Weiner and Wilson in Fig. 13, page 22; and described on the same page in section 11B2 entitled "Clock and Cycling Unit."

Another suitable timing unit is described and claimed in the copending application of Auerbach, Minkow and Schreiner, Serial No. 471,696, filed November 29, 1954, and assigned to the same assignee.

Included in Fig. 3 is the pulse pattern of part of a typical word. It should be noted that the sign digit occupies the T33, T34, T35 and T36 positions in a word. It should also be noted that bit and digit positions increase in significance with increasing time (in the example shown the least significant bit position occurs first in time).

The apparatus and operation of the input unit 2, the output unit 8, the shift register 18, the indicator detector 14 and the input-output control 16 are hereinafter described in detail.

*Input unit 2*

Referring to Fig. 4, the input unit 2 comprises the keyboard 4 and the encoder 6.

The keyboard 4 includes a plurality of keys **4–*a*, 4–*b*, 4–, , . . . 4–1, 4–3**, and so on (only a portion of which is shown), the number of keys corresponding to the number of characters required by the computing system; with the latter, number or character following the hyphen indicating the character represented by the key. A single representative key with its associated circuitry will be described in detail, the associated circuitry being similarly designated.

Key 4–, (corresponding to the character comma) is a single-pole single-throw switch, the key lever 170–, corresponding to the pole. The key lever 170–, referred to a positive five volts supply via resistor 176–, is normally maintained in the open position. When the key lever 170–, is depressed, contact is switched to the lower contact 174–, and a positive potential is applied to the lower contact 174–,.

Each key of the keyboard 4 is connected to the encoder 6. More particularly, the lower contact 174–, of key 4–, is coupled to the negative supply bus 10 via the load resistor 180–, and to the crystal diodes 182–,5 and 182–,6 of the encoder 6. The cathodes 186–,5 and 186–,6 of the respective crystal diodes 182–,5 and 182–,6 are coupled to the negative supply bus 10 by means of the respective resistors 188–5 and 188–6 while their anodes 190–,5 and 190–,6 are connected to the lower contact 174–,. The cathodes 186–,5 and 186–,6 are also coupled to the input terminals 192–5 and 192–6 of the D.-C. amplifiers 194–5 and 194–6.

It should be noted that the two characters following the hyphen of each crystal diode 182 determine the location of each crystal diode 182 since the first character is associated with a particular key and the second letter with a particular D.-C. amplifier. It should be noted also that the crystal diode 182 associated with any one key are never connected to the same D.-C. amplifier 194. Furthermore, the crystal diodes 182 associated with each key are connected to a combination of D.-C. amplifiers 194 different from that of any other key, so that only one key will apply signals to a given combination of D.-C. amplifiers 194.

Now assume that the D.-C. amplifiers 194 are not set. Therefore, the potential at all of the D.-C. amplifier output terminals 200 will be minus ten volts as heretofore explained. The crystal diodes 182 are initially nonconductive since their anodes 190 are not at a higher potential than their cathodes 186 which also are maintained at minus ten volts.

When key 4–, is operated, a potential of approximately plus five volts potential is impressed on the anodes 190–, of the associated crystal diodes 182–,. These crystal diodes 182–, will then conduct, changing the signal from minus ten to plus five volts at the input terminals 192–5 and 192–6 of the corresponding D.-C. amplifiers 194–5 and 194–6 causing the D.-C. amplifiers to set and changing the potentials of the output terminals 200–5 and 200–6 from minus ten to plus five volts.

Thus whenever any key of the typewriter keyboard 4 is depressed at least one of the output terminals 200 assumes a positive potential. Since all the output terminals 200 are fed to the buffer 202 the positive potential will be fed to the input-output control 16 via the encoder common line 28.

It should be noted that the depressing of a key of the typewriter 4 is an asynchronous operation. So it will be necessary to synchronize the sampling of the output terminals 200 with the timing unit 20.

The asynchronous signal fed to the input-output control 16 is synchronized as will hereinafter be described and the input-output control 16 feeds back a signal in synchronism with the timing unit 20 via synchronized sampling line 38. It is seen that synchronized sample line 38 feeds each of the gates 204–0 to 204–6. Hence when a key is depressed several of the gates 204 are synchronously primed. Each of the gates is sequentially probed by the *t* pulses and whenever a coincidence occurs at any of the gates the pulse is fed through the buffer 206 to the pulse amplifier 208. The pulses then pass serially to the shift register 18 via the information input line 40.

To distinguish alphabetic characters it is necessary to first type in the alphabetic indicator as has been described. The comma (,) will cause the output terminals 200–5 and 200–6 to assume positive potentials. The sign gate 210 detects this combination and feeds a signal via sign digit line 26 to the input-output unit 16. If the comma is present in the sign digit position then upon typing in the next character a positive signal is fed to the gates 204–0, 204–1 and 204–2 via the first group control line 30*a* and a negative signal is fed via the second group control line 30*b* to the gates 204–3, 204–4, 204–5 and 204–6. After thirty-six pulse times or a "minor cycle" the polarities of the signals on the two lines interchange. Hence during an alphabetic insert first the gates 204–0 to 204–2 are serially probed and then the gates 204–3 to 204–6 are serially probed for each character inserted after the sign change.

The insertion of the character A will now be discussed. It is assumed that a comma was inserted in the sign digit. When the key 4–A is depressed it is seen that the output terminals 200–2 and 200–4 of the D.-C. amplifiers 194–2 and 194–4 assume positive potentials. The signals are fed via buffer 202 and encoder common line 28 to the input-output unit 16. The input-output 16 feeds a positive signal to synchronized sampling line 38 to permit the probing of the gates 204. Since the information is alphabetic a positive signal is present on first group control line 30*a*. At time *t*1 a pulse passes through the gate 204–2 to the buffer 206. At time *t*2 no pulse passes through the gate 204–1 (the potential on the output terminal 200–1 is negative). At time *t*3 a pulse passes through the gate 204–0, at time *t*4 nothing occurs. Hence serially in time, the signals passing on the information input line 40 have been pulse, no pulse, pulse, no pulse or the coded combination 1010. If the least significant bit occurs first in time then the coded combination is the excess-three value for decimal two.

After thirty-six pulse times the positive signal is still present on the synchronized sampling line 38 but the polarities of the potentials on the first and second group control lines 30*a* and 30*b* interchange. It is now seen that at *t*1 no pulse passes through the gate 204–6, at *t*2 no pulse passes through the gate 204–5, at *t*3 a pulse passes through the gate 204–3 and at the time *t*4 no pulse passes through the gate 204–3 to the buffer 206.

Hence on the second serial probing the pulse pattern fed to the shift register 18 is no pulse, no pulse, pulse, no pulse (0010). Again assuming the least significant bit occurs first in time the code group is equivalent to excess-three coded decimal one. In two probings of the gates 204 the encoder fed to the pulse code equivalent of (21) or the letter A to the shift register 18.

During the insertion of a numeric word there is only one probing cycle per character and during this probing cycle only the gates 204–3, 204–4, 204–5, 204–6 are sampled.

It should be noted that several characters can cause the output terminals 200–5 and 200–6 to be simultaneously positive and hence cause a positive signal to pass through the gate 210 to the sign digit line 26. It would seem that when one of these characters occurred during a numeric word the alphabetic mechanism would be activated. As will hereinafter be described the sampling of the alphabetic indicator can only occur during the insertion of the first character of a word.

*Output unit 8*

Referring to Fig. 5, the output unit 8 is shown comprising the decoder 12 and the printer 10.

The printer 10 includes a plurality of print bars 10–*a*, 10–„ 10–+, . . . 10–1, 10–2, 10–3, and so on (only a portion of which is shown), the number of print bars corresponding to the number of characters represented by the keyboard 4; the letter, number or symbol following the hyphen indicating the character represented by the print bar. When the print bar is activated, the character is printed by the printer 10, which may be the printing portion of an electric typewriter. A single typical print bar with its associated circuitry will be described in detail, the associated circuitry for each particular character being designated by a similar reference character following a hyphen.

Print bar 10–, (corresponding to the character (,) comma is connected to the actuating lever 240–, which is operated by the magnetic actuator 242–,. The magnetic actuator 242–, is coupled to the positive supply bus 100 by means of the normally open relay contacts 244 of the print relay 245, and to ground via the thyratron 248–,.

The print relay 245 is energized by the D.-C. amplifier 264.

The thyratron 248–, of the decoder 12 comprises an anode 252–„ a cathode 254–„ and a control grid 258–,. The thyratron 248–, has the property that it will fire and ground the magnetic actuator 242–, causing the character (,) to print when the control grid 258–, is at a positive potential of say five volts and the print relay 245 is actuated.

The control grid 258–, is connected to the positive supply bus 5 via the resistors 260–, and 266–, in series. Thus, if the junction 265–, of the two resistors 260–, and 266–, is not clamped at a voltage lower than plus five volts, a positive voltage of five volts will be applied to the control grid 258–,. The thyratron 248–, will fire actuating the print bar 240–, when the relay contacts 244 are closed. However, the normal case is to have the control grid negative so that the thyratron 248–, does not conduct.

The decoder 12 includes the flip-flops 270*a*–270*f*. The inputs of the flip-flops 270*a*–270*f* are connected via the decoder gates 276*a*–276*f* respectively to the coded bit lines 46*a*–46*f*. A plurality of crystal diodes 274–, connect either the positive or negative output of each flip-flop 270*a*–270*f* to the junction 265–,. (Note that the alphabetic reference characters of the crystal diodes 274 are determined by the thyratron 248 and flip-flop 270 associated with it.) The arrangement is such that, except for a particular combination of flip-flops being set, the junction 265–, is maintained at a potential of minus ten volts. When the flip-flops 270*a*–270*f* of the decoder 12 are set to correspond to a particular digit, then the control grid 258 of one of the thyratrons 248 which represents a character having the same digit will be at a positive potential of five volts.

More particularly, each crystal diode 274–, comprises an anode 278–, connected to the corresponding junction 265–, and a cathode 280–, coupled to the positive or negative output of one of the flip-flops 270. If any of the cathodes 280–, is at a potential of minus ten volts, the junction will be maintained at that voltage disconnecting the remaining crystal diodes 274–, coupled to that junction. In other words, all of the cathodes 280–, associated with the thyratron 248–, must be at a positive potential of five volts and the relay contacts 244 closed before the thyratron 248–, will fire and the character "," (comma) be printed.

The connections are arranged so that a unique combination of the flip-flops 270 must be set in order to actuate a particular character of the printer 10.

For example, assume the character, is represented by the appropriate arrangement of signals on the coded bit lines 46. When the decoder gates 276 are sampled, only the flip-flops 270*c* and 270*d* can be set. When these flip-flops are set a positive potential will exist on all of the cathodes 280–, and the control grid 258–, of the thyratron 248–, will be at a positive potential of five volts. If any other arrangement of flip-flops 270 are set, the control grid of the thyratron 248–, cannot be at a negative potential.

After the appropriate flip-flops 270 are set, a print signal pulse is transmitted from the D.-C. amplifier 264 which is connected to the coil 246 of the relay 245. The relay 245 operates, closing relay contacts 244 and firing thyratron 248–, so that the character "," (comma) is printed. Thereafter, a reset pulse is fed via decoder clear line 54 to the reset terminals of the flip-flops 270, clearing the flip-flops 270 for the next character to be transmitted from the shift register 18.

As was heretofore stated the flip-flops 270 are set by signals from the sample gates 276. The actual sampling operation will now be described. Each of the gates 276 has an input terminal connected to one of the coded bit lines 46. Since each of the coded bit lines 46 is connected to the shift register 18 the characters as represented by a serial grouping of pulse signals are continuously fed to the sample gates 276. Shift register 18 is a dynamic device in which the pulse trains constantly circulate, hence the pulse signals present on the coded bit lines 46 are constantly changing. It is, therefore, necessary to probe the sample gates 276 at specific times in order to obtain the true significance of the coded combinations of pulse signals present on the lines 46.

Accordingly a sampling signal from input-output control 16 is fed via the decoder sampling line 50 to an input terminal of each of the sample gates 276. The sampling signal is synchronized to occur when the pulse signals present on the coded bit lines 46 have the proper significance.

It should be noted that the gates **276*a* and 276*b* each have two other input terminals. The gates 276*a* and 276*b* are used solely for alphabetic characters. Signals present on these input terminals control the alphabetic typeout. A negative potential fed from input-output control 16 is present on the sign inhibiting line 56 for blocking the gates 276*a* and 276*b* during the sampling and typing out of the sign digit of each word. After the sign digit is typed out a positive potential appears on the sign inhibiting line 56**.

Whenever the characters to be typed out are alphabetic a postive potential is fed from the indicator detector 14 via alphabetic line 34 to the respective input terminals of the decoder gates **276*a* and 276*b*. If the characters are part of a numeric word then a negative potential will be present on the alphabetic line 34 and the decoder gates 276*a* and 276*b*** are blocked.

Thus it is seen that during the typeout operation all six of the sample gates **276*a* to 276*f* are probed for alphabetic characters but for numeric characters only the four gates 276*c* to 276*f*** are probed.

The sign gate 268 whose input terminals are respectively connected to the positive output terminals of the flip-flops **270*c* and 270*d* detects the alphabetic indicator. The coincidence of positive potentials at the input terminals of the sign gate 268 causes a positive potential to be fed to the indicator detector 14 via the sign bit line 52** for indicating the character may be a comma.

The probing of the gates 276 causes the appropriate flip-flops 270 to be set and the grid of the selected thyratron 248 raised to a firing potential. The thyratron 248 will thus fire and energize a magnetic actuator 242 whenever plate power is applied through the activation of the relay 245 by the D.-C. amplifier 264.

Each of the positive output terminals of the flip-flops 270 is fed to the buffer 262, hence whenever anyone of the flip-flops 270 is set a positive signal is fed to the D.-C. amplifier 264 thus activating relay 245.

In addition, the positive output of the D.-C. amplifier 264 is coupled to the decoder common bit line 48 for transmitting the positive signal to the input-output control 16. After a time delay suitable for permitting the magnetic actuators 242 to operate the input-output control 16 resets the flip-flops 270 via the decoder clear line 54. The decoder 12 is again ready to receive the next coded combination of pulses.

It should be noted that only six flip-flops 270 are required to decode all characters although alphabetic characters are represented by two four pulse code groups. The two most significant bits of the more significant code group are identical for all alphabetic characters hence no need arises to decode these two bits.

*Shift register 18*

Referring to Fig. 6 the shift register 18 is shown comprising a plurality of delay lines and reshapers serially connected to form a closed loop, a left shift generator, a group of input gates, and a group of print pulse amplifiers.

The loop is considered to start at the reshaper 600 which is coupled to the reshaper 602. The least significant bit of information is timed to enter the reshaper 600 at *t*1. The reshaper 602 feeds the delay line 604 which introduces a five and three quarter pulse time delay. The output of the delay line 604 is coupled to the reshaper 606 which in turn feeds the six pulse time delay line 608. The output of the delay line 608 is coupled to the input of the reshaper 610 whose output feeds the six pulse time delay line 612. The reshaper 614 fed by the delay line 612 feeds the delay line 616. The six pulse time delay line 616 feeds the reshaper 618 which in turn is coupled to the five and one quarter pulse time delay line 620. The reshaper 622 coupled to the delay line 620 feeds the five pulse time delay line 624 which in turn feeds the reshaper 626. The reshaper 626 is considered to be the end of the loop.

The loop can close in on itself by one of two possible paths. The output terminal of the reshaper 626 is coupled to the input terminal of the reshaper 600 via either the gate 628 or the gate 630 and the four pulse delay line 632.

It should be noted that the total time delay in the loop is thirty-six pulse times. Since each bit occupies one pulse it is possible to store thirty-six bits in the register. Actually four pulse groups are stored hence nine four pulse groups is the capacity of the storage register.

Any information in the form of pulses fed to the reshaper 600 should circulate through the loop to the output of the reshaper 626.

When the information in the register is not to be shifted left the gate 628 is activated and the gate 630 is blocked. During a left shift operation, the gate 630 is activated and the gate 628 is blocked. It should be noted that the path through the gate 630 includes the delay line 632 where a four pulse time delay is introduced. The effect of the four pulse delay is to precess all the information one digit position (four bit positions) to the left.

The control of the switching of the paths is handled by the left shift generator 635. The left shift generator comprises the D.-C. amplifier 634, the buffer 636, the delay line 638, the flip-flop 640, the buffer 642, the reshaper 644, the buffer 646 and the gate 648.

Ordinarily, the potential on line 651 is positive and the potential of line 650 is negative, causing all information circulating in the loop to pass through gate 628. Upon receipt of a pulse via line **36*a* the output lines 650 and 651 of the left shift generator interchange potentials for a time duration equivalent to thirty-six pulse times. This switch of potentials causes the information to now pass through the gate 630** and a one digit left shift is accomplished.

The $-t(1–4)$ signal fed to an input terminal of the gate 630 causes the deletion of the least significant digit circulating in the loop. The occurrence of $-t(1–4)$ signal at the gate 630 is timed to prevent the least significant digit from recirculating.

The input control gates comprise the gates 652 and 654. The input information gate 652 feeds information received from the encoder 6 via information input line 40. The second input terminal of the input information gate 652 receives a control signal from the input-output control 16 via the line 36*c*. The signal only permits the insertion of information during the insert operation. On the output or typeout operation the signal assumes a negative potential and the input information gate 652 is blocked.

During the output operation the shift register 18 receives information from the memory 24 via memory output line 44 to the gate 654. The output terminal of the gate 654 is connected to the input terminal of the reshaper 600.

The signal on the line 36*d* feeding an input terminal of the gate 654 is the inverse of the signal on the line 36*c* feeding the gate 652, hence the shifting storage register can only receive information from either the encoder 6 or the memory 24 at one time.

The third input terminal of the gate 654 is coupled to the line 36*e*. The line 36*e* carries a control signal from the input-output control 16 for restricting the transfer of information from the memory 24 to specifically designated times. For example, it will only permit the reloading of the shift storage register only after a complete word has been typed out.

The buffer 656 whose output terminal feeds respective input terminals of both the gate 628 and the gate 630 is used to clear the shift register 18 of the used information while the new information is inserted via the gate 654.

The signal on the line 36*e* feeding the gate 654 and the signal on the line 36*f* feeding the buffer 656 are the inverse of each other, hence during the typeout operation when the gate 654 is activated the gate 630 and the gate 628 are blocked. Also when the gate 628 and gate 630 are unblocked by the line 36*f* acting through the buffer 656 the gate 654 is blocked by the signal on the line 36*e*.

During the typeout operation the information in the form of pulse signals continues circulating in the shift register 18. Six taps are made in the loop. Each tap is displaced from the other by a one pulse time delay. Each tap feeds a pulse amplifier for generating pulse signals which are fed to the decoder 12. The print pulse amplifiers 660, 662, 664, 666, 668 and 670 feed the 46*a, b, c, d, e* and *f* lines of the coded bit cable 46. The function of the six print pulse amplifiers 660–670 is to convert a serial array of a six pulse code group to a parallel array for simultaneous feed to the decoder 12.

*Indicator detector 14 and input-output control 16*

Referring to Fig. 7 the indicator detector 14 and the input output control 16 are shown comprising the synchronizer 900, the input-output selector 902, the binary counter 904, the detector primer 906 and the digit counter 908.

The input-output selector 902 comprises the single pole double throw switch 910 and the D.-C. amplifier 912. One of the fixed contacts 914 of the switch 910 is connected to a positive five volts supply. The other fixed contact 916 is coupled to a negative ten volts supply. The moving contact 918 is connected to the input terminal of the D.-C. amplifier 912 via the resistor 911.

During an insert operation the moving contact 918 is connected to the plus five volt supply via the fixed contact 914 thus energizing the D.-C. amplifier 912. During the typeout operation the moving contact 918 is coupled to the negative ten volt supply via the fixed contact 916 and the D.-C. amplifier 912 is deenergized.

The positive output terminal of the D.-C. amplifier 912 is coupled via a control line 36*c* to the shift register 18 and via the line 920 to the indicator detector 14. The negative output terminal of the D.-C. amplifier 912 is coupled to the shift register 18 via control line 36*d* and to the synchronizer 900 via the line 922. The function of the input-output selector 902 is to prepare the apparatus for either an insert operation or a typeout operation.

The detector primer 906 comprises the S. P. D. T. switch 924. The moving contact 926 is coupled via a capacitor 928 to the negative ten volt supply. The normally closed contact is returned to a positive five volt supply via a resistor 930. The normally open contact 929 is coupled to the indicator detector 14 via the line 932.

When the S. P. D. T. switch 924 is in the normally closed position the capacitor becomes charged to fifteen volts. When the moving contact 926 is then switched to the normally open contact 929 a positive fifteen volt transient is fed to indicator detector 14 via the line 932.

The function of the detector primer 906 is to initially prime the indicator detector 14 during an insert operation.

The synchronizer 900 comprises the typeout trigger gate 934, the buffer 935, the delay flip-flops 936, 938 and 940, the clear pulse amplifier 943, the buffer 941, the synchronizing flip-flops 942 and 944 with their associated gates 946 and 952 and buffers 948 and 950, and the reshapers 954 and 956.

The delay flip-flops 936, 938 and 940 may be any type circuit which is able to generate trigger pulses approximated fifteen to fifty milliseconds after receipt of a trigger pulse. A vacuum tube circuit such as a cathode-coupled delay multivibrator can be used. A suitable circuit can be found in sec. 19–3 (pp. 416–418) entitled "The Cathode-Coupled Gate," of Electron-Tube Circuits by S. Seeley, the first edition, third impression published by McGraw-Hill.

The synchronizer 900 functions as follows: On an insert operation the signal from the encoder 6 is fed via encoder common line 28 to the differentiating capacitor 958. The differentiated leading end of the signal acting through the buffer 941 triggers the delay flip-flop 940. Fifteen milliseconds later (time enough for any bounce in the keyboard keys to disappear) a positive trigger sets the first synchronizing flip-flop 942. The positive output terminal of the flip-flop asynchronously assumes a positive potential. The first *t*30 that then occurs triggers the second synchronizing flip-flop 944. The positive output terminal of the second synchronizing flip-flop synchronously (at a time *t*30) assumes a positive potential.

The negative output terminal of the second synchronizing flip-flop 944 acting through the buffer 948 resets the first synchronizing flip-flop four pulse times later at *t*34.

The second synchronizing flip-flop is set and will remain set for thirty-five pulse times until the next —*t*29 is fed via the buffer 950 to the reset terminal of the second synchronizing flip-flop 944. During an alphabetic insert or alphabetic typeout operation a positive signal on the line 958 blocks the first —*t*29 at the gate 950 and then disappears to allow the second —*t*29 to reset the second synchronizing flip-flop 944 which thus has remained set for approximately two minor cycles (seventy-one pulse times).

The positive output terminal of the second synchronizing flip-flop 944 is coupled to the encoder 6 via the synchronized sampling line 38. The positive potential present on the synchronized sampling line 38 when the second synchronizing flip-flop 944 is set permits the sequential probing of encoder gates in the encoder 6 as heretofore described.

The positive terminal of the second synchronizing flip-flop 944 is also coupled to an input terminal of the gate 952 for permitting a *t*34 pulse to trigger the reshaper 954. The pulse (hereinafter called the set shift left pulse) generated by the reshaper 954 is fed via the register control line 36*a* to the shift register 18 for initiating a one digit left shift. It should be noted that during an alphabetic operation when the second synchronizing flip-flop 944 remains set for two word lengths a second t34 pulse triggers the reshaper 954 generating a second set shift left pulse.

The set shift left pulse attempts to trigger the reshaper 956. During an insert operation the negative potential present on the line 922 feeding a blocking terminal of the reshaper 956 prevents the generation of a pulse. During a typeout operation of alphabetic characters the potential present on the line 960 from the binary counter 904 permits only every other set shift left pulse to trigger the reshaper 956.

The pulse generated by the reshaper 956 is fed via the decoder sampling line 50 to the decoder 12 to permit the probing of the decoder sampling gate during a typeout operation. The pulse generated by the reshaper 956 is also fed via the line 962 to the indicator detector 14 for testing the sign digit during a typeout operation.

The indicator detector 14 is shown comprising the priming flip-flop 964, the three quarters of a pulse time delay line 966, the reshaper 968, the input sign testing gate 970, the typeout sign testing gate 972 and the alphabetic flip-flop 976.

Initially during the input operation the priming flip-flop 964 is set via the line 932 (for all other words the priming flip-flop is set via the line 978). The potential of positive output terminal of the priming flip-flop 964 is fed to both the input sign testing gate 970, and the typeout sign testing gate 972.

During an insert operation the potential on the line 920 is positive permitting a sampling of the signals fed from the encoder 6 by the sign digit line 26. The set shift left pulse triggers the reshaper 968 via the line 978 to generate a pulse for performing the test for the sign digit position. If the character in the sign digit position is a comma (,) then the gate 970 passes a pulse to set the alphabetic flip-flop 976.

During a typeout operation the potential on the line 920 will be negative and the gate 970 is blocked. The potential on the line 922 is positive permitting the set shift left pulse to trigger the reshaper 956. The pulse generated by the reshaper 956 is fed via the line 962 to an input terminal of the gate 972. The third input of the gate 972 is fed by the sign bit line 52 from the decoder 12. If the sign digit position has the coded combination (0011) the potential on the sign bit line will be positive and the gate 972 will pass a pulse to set the alphabetic flip-flop 976.

The positive output terminal of the alphabetic flip-flop 976 is coupled to the alphabetic line 34 which controls the alphabetic decoding in the decoder 12. The positive output terminal of the alphabetic flip-flop 976 is also coupled to the binary counter 904 via the line 980.

At the end of the handling of each word a reset signal is fed from the digit counter 908 via the line 980 to the reset terminal of the alphabetic flip-flop 976 to prepare the indicator detector 14 for testing the sign digit position of the new word.

It should be noted that other characters within a word structure can generate signals similar to the comma in the sign digit position. Therefore it is necessary to limit the test for the indicator digit to only the sign digit position.

It will be recalled that the priming flip-flop 964 was set at the beginning of the insert operation. The first set shift left pulse fed via the line 978 triggers the reshaper 968 and the testing of the sign digit position is performed. At the same time a negative pulse from the negative output terminal of the reshaper 968 is fed via the delay line 966 to the reset terminal of the priming flip-flop 964. Thus immediately after the test is performed the priming flip-flop 964 is reset thus preventing any further tests. Upon the complete handling of the word a pulse via line 978 will again set the priming flip-flop 964.

The binary counter 904 is shown comprising the flip-flop 988, the three quarter pulse time delay line 986, the gate 984 and the buffer 982. The function of the binary counter 904 is to generate a pair of control signals which change polarity each time the counter is triggered.

The operation of the binary counter is controlled by the potential on the line 980 from the alphabetic flip-flop 976. A positive potential fed to the reset terminal of the flip-flop 988 by the line 980 from the alphabetic flip-flop 976 permits the binary counter to operate while a negative potential on the same line disables the counter. Thus the binary counter 904 only operates when alphabetic characters are handled.

When alphabetic characters are being handled the alphabetic flip-flop 976 will be set and hence the binary counter 904 is activated. The first set shift left pulse one line 978 sets the flip-flop 988 via the gate 984. The negative equivalent of the second set shift left pulse resets the flip-flop 988 via the line 990 and the buffer 982. The third set shift pulse again sets the flip-flop 988, etc.

The output terminals of the flip-flop 988 are connected to the several encoder gates of the encoder 4 via the group control lines **30*a* and 30*b* to permit the sequential probing of the two groups of gates during an alphabetic insert operation. The positive output terminal is also coupled to the buffer 950 of the synchronizer 900 by the line 958 for permitting the synchronizing flip-flop 944 to remain set for two word length times (seventy-one pulse times) during an alphabetic operation. This permits a double probing of the gates of the encoder 4** and the generation of two set shift left pulses per character during an alphabetic operation.

The digit counter 908 is shown comprising the gate 992, the scaler 994, the flip-flop 996, the buffer 998 and the delay line 999.

The scaler 994 can be four binary counters similar to the binary counter 904 suitably arranged in cascade. The scaler 994 functions by counting the number of set shift left pulses per word. The scaler 994 is arranged to recycle each eight pulses.

The set shift left pulses to be counted are fed to the scaler 994 via the line 978 and the gate 992. The second input of the gate 992 is fed from the negative output terminal of the priming flip-flop 964 via the line 997. This prevents the set shift left pulse associated with the sign digit position from being counted.

When eight set shift left pulses have been counted indicating the completion of a word a positive trigger from the positive output terminal of the scaler sets the flip-flop 996. At the same time, a negative trigger from the negative output terminal is fed via the line 980 to the reset terminal of the alphabetic flip-flop 976 preparatory to handling the next word.

The flip-flop 996 remains set for one word time (thirty-six pulse times) and is then reset by the $-t34\frac{1}{2}$ fed through the buffer 998 to the reset terminal. The positive and negative output terminal of the flip-flop 996 are respectively coupled to the shift register 18 via the register control lines **36*e* and 36*f*** for permitting the insertion of information from the memory during a typeout operation.

At the onset of the typeout operation the flip-flop 996 is initially set by a signal fed via the line 60 from the computer control 22.

The memory 24 may be of the type described in the Proceedings of the I. R. E., August 1949, volume 37, Number 8, in the article entitled "Mercury Delay Line Memory Using a Pulse Rate of Several Megacycles," pages 855 to 861, by Auerbach, Eckert, Shaw, and Shappard; and including a selector circuit similar to that described in the above-cited "Binac" article on page 23 in section IIIB3.

While only one representative embodiment of the invention disclosed herein has been outlined in detail, there will be obvious to those skilled in the art, many modifications and variations accomplishing the foregoing objects and realizing many or all of the advantages, but which do not depart essentially from the spirit of the invention.

What is claimed is:

1. In a data processing system for processing mixed alphabetic and numeric data, means for representing the numeric characters by signals representing single digits, means for representing the alphabetic and also said numeric characters by signals representing pairs of said single digits, means to combine said digits in an assortment, and means for providing an indicator signal associated with said assortment for determining whether the digits of said assortment are to be interpreted singly or in pairs.

2. In a data processing system for processing mixed alphabetic and numeric data, means for representing each numeric character by predetermined pulse groups, means for representing each alphabetic and also each of said numeric characters by pairs of pulse groups, means to combine said pulse groups in an assortment having a predetermined number of said pulse groups, and means for providing an indicator pulse group as part of said assortment for indicating whether said pulse groups of said assortment are to be manipulated singly or in pairs.

3. In a data processing system for processing data composed of both alphabetic and numeric characters, means to represent each of said numeric characters by coded pulse groups, means to represent said alphabetic and also said numeric characters by pairs of coded pulse groups, means to combine said coded pulse groups in a word, and an indicator pulse group associated with each of said words for indicating whether said coded pulse groups of the respective words are to be interpreted singly or in pairs.

4. In a data processing system for processing mixed alphabetic and numeric data, means to represent numeric characters by a plurality of indicia representing first digits, means to represent alphabetic and also said numeric characters by a plurality of combinations of said indicia representing first digits and a plurality of signals representing second digits, means to combine said first digits or said combinations of said first and second digits in an assortment, and indicium means associated with said assortment for indicating whether the digits of said assortment are interpreted as said first digits or as combinations of said first digits and said second digits.

5. In a data processing system for processing mixed alphabetic and numeric data, means to represent each numeric character as a digit in the form of a coded combination of pulses, means to represent each alphabetic and also each of said numeric characters by a plurality of coded pulse combinations representing first digits and coded pulse combinations representing second digits, means to combine said first digits or said combinations of said first and second digits in assortments of a fixed number of digits, and an indicator digit associated with each of said assortments for indicating whether the digits of said assortment are interpreted as said first digits or as combinations of said first digits and said second digits.

6. In a data processing system for processing mixed alphabetic and numeric data, means for representing each numeric character by a coded pulse group representing first digits, means for representing alphabetic and also said numeric characters by a plurality of combinations of coded pulse groups representing first digits and coded pulse groups representing second digits, means to combine said first digits or said combinations of said first and second digits in words of a fixed number of digits, and means for generating a sign digit at the beginning of each of said words for indicating whether the digits of the respective words are interpreted as said first digits or as combinations of said first digits and said second digits.

7. Apparatus for transferring information in the form of alphabetic and numeric characters represented by electrical signals to a utilization device comprising encoding means for converting said characters to digits represented by coded combinations of pulses wherein a numeric character is represented by a single digit or a pair of digits and an alphabetic character is always represented by a pair of digits, storage means for temporarily storing a group of digits, said storage means being loaded by said encoder, an indicator digit always entered as the first digit of a group, control means responsive to said indicator digit, said control means determining whether the subsequent characters are to be transferred from said encoder to said storage means as single digits or as pairs of digits.

8. Apparatus for transferring information in the form of alphabetic and numeric characters represented by electrical signals comprising encoding means for converting said characters to digits represented by coded combinations of pulses wherein a numeric character is represented by a single digit or a pair of digits and an alphabetic character is always represented by a pair of digits, storage means for temporarily storing a predetermined number of groups of digits, said storage means being fed by said encoder, means for generating an indicator digit, said indicator digit to be entered as the first digit, control means responsive to said indicator digit, said control means determining whether the subsequent characters are to be transferred from said encoder to said storage means as single digits or as pairs of digits.

9. Apparatus for transferring information in the form of alphabetic and numeric characters represented by groups of electrical signals comprising translating means for translating said electrical signals to characters wherein a numeric character is electrically represented by a single group or a pair of groups and an alphabetic character is always electrically represented by a pair of groups, and control means for determining whether characters are to be translated from electrical signals representing single groups or electrical signals representing pairs of groups.

10. Apparatus for handling information in the form of alphabetic and numeric characters represented by groups of electrical signals comprising storage means for storing said electrical signals wherein a numeric character is electrically represented by a single group or a pair of groups and an alphabetic character is always electrically represented by a pair of groups, and means for determining whether characters are to be handled as electrical signals representing single groups or electrical signals representing pairs of groups.

11. Apparatus for transferring information in the form of alphabetic and numeric characters represented by groups of electrical signals comprising translating means for translating said electrical signals to characters wherein a numeric character is electrically represented by a single group or a pair of groups and an alphabetic character is always electrically represented by a pair of groups, and translation means responsive to predetermined signals for determining whether characters are to be translated from electrical signals representing single groups or electrical signals representing pairs of groups.

12. Apparatus for transferring information in the form of alphabetic and numeric characters represented by groups of electrical signals comprising means for handling said electrical signals as characters wherein a numeric character is electrically represented by a single group or a pair of groups and an alphabetic character is always electrically represented by a pair of groups, and control means responsive to indicator signals associated with assortments of groups for determining whether characters are to be translated from electrical signals representing single groups or electrical signals representing pairs of groups.

13. Apparatus for transferring information in the form of alphabetic and numeric characters represented by digits in the form of coded combinations of pulses wherein a numeric character is represented by a single digit or a pair of digits and an alphabetic character is always represented by a pair of digits, comprising storage means for temporarily storing a predetermined group of digits, decoding means selectively responsive to said storage means for converting the coded combinations of pulses to characters, an indicator digit being in the first digit position of a group of digits, control means responsive to said indicator digit, said control means determining whether the subsequent digits are to be transferred from said storage means to said decoding means as single digits or as pairs of digits.

References Cited in the file of this patent

UNITED STATES PATENTS

| | | |
|---|---|---|
| 2,074,423 | Peterman | Mar. 23, 1937 |
| 2,234,684 | Robinson | Mar. 11, 1941 |
| 2,264,563 | Bumstead | Dec. 2, 1941 |
| 2,653,996 | Wright | Sept. 29, 1953 |